US012705849B2

(12) United States Patent
Koo

(10) Patent No.: US 12,705,849 B2
(45) Date of Patent: Aug. 11, 2026

(54) ORAL IMAGE PROCESSING METHOD AND DATA PROCESSING DEVICE

(71) Applicant: MEDIT CORP., Seoul (KR)

(72) Inventor: Minkyo Koo, Seoul (KR)

(73) Assignee: MEDIT CORP., Seoul (KR)

( * ) Notice: Subject to any disclaimer, the term of this patent is extended or adjusted under 35 U.S.C. 154(b) by 113 days.

(21) Appl. No.: 18/698,120

(22) PCT Filed: Oct. 10, 2022

(86) PCT No.: PCT/KR2022/015231
§ 371 (c)(1),
(2) Date: Apr. 3, 2024

(87) PCT Pub. No.: WO2023/059166
PCT Pub. Date: Apr. 13, 2023

(65) Prior Publication Data

US 2024/0404231 A1 Dec. 5, 2024

(30) Foreign Application Priority Data

Oct. 8, 2021 (KR) ........................ 10-2021-0134464

(51) Int. Cl.
*G06T 19/20* (2011.01)
*A61C 13/34* (2006.01)
*G06T 15/06* (2011.01)

(52) U.S. Cl.
CPC .............. *G06T 19/20* (2013.01); *A61C 13/34* (2013.01); *G06T 15/06* (2013.01);
(Continued)

(58) Field of Classification Search
CPC ..... G06T 19/20; G06T 15/06; G06T 2200/24; G06T 2210/21; G06T 2210/41;
(Continued)

(56) References Cited

U.S. PATENT DOCUMENTS

2012/0070803 A1* 3/2012 Manai ................ A61C 13/0004 433/213
2017/0364659 A1* 12/2017 Choi .................. A61C 13/0004
(Continued)

FOREIGN PATENT DOCUMENTS

JP 09-19443 A 1/1997
KR 10-2016-0083787 A 7/2016
(Continued)

OTHER PUBLICATIONS

Choe, machine translation of KR-101921063-B1 (Year: 2018).*
Office Action issued Sep. 26, 2024 in Korean Application No. 10-2022-0129959.
International Search Report for PCT/KR2022/015231 dated Jan. 18, 2023 (PCT/ISA/210).

*Primary Examiner* — Kee M Tung
*Assistant Examiner* — Xiaoming Wei
(74) *Attorney, Agent, or Firm* — Sughrue Mion, PLLC

(57) ABSTRACT

Provided are a method and device for processing an oral image according to embodiments. The oral image processing method includes displaying adjacent tooth data adjacent to preparation tooth data and restoration data for restoration of the preparation tooth data, receiving an input for adjusting adaptation between the restoration data and the adjacent tooth data, processing the adaptation between the restoration data and the adjacent tooth data in response to the received input, and displaying the restoration data adapted according to the processed adaptation.

13 Claims, 25 Drawing Sheets

(52) U.S. Cl.
CPC ...... *G06T 2200/24* (2013.01); *G06T 2210/21* (2013.01); *G06T 2210/41* (2013.01); *G06T 2219/2016* (2013.01); *G06T 2219/2021* (2013.01)

(58) Field of Classification Search
CPC ..... G06T 2219/2016; G06T 2219/2021; A61C 13/34; A61C 7/002; A61C 5/77; A61C 9/00; A61C 13/00; A61C 13/0004; A61C 13/08; A61C 9/0046; A61C 9/0053; A61B 18/20; A61B 34/10; A61B 5/0062; A61B 5/0088; A61B 2018/20353; A61B 2034/102; G16H 30/00; G16H 50/50
See application file for complete search history.

(56) References Cited

U.S. PATENT DOCUMENTS

| | | | | |
|---|---|---|---|---|
| 2021/0169607 | A1* | 6/2021 | Fisker | G16B 5/00 |
| 2025/0221796 | A1* | 7/2025 | Cunliffe | A61C 7/002 |

FOREIGN PATENT DOCUMENTS

| | | | | | |
|---|---|---|---|---|---|
| KR | 10-1854732 | B1 | | 5/2018 | |
| KR | 10-1860878 | B1 | | 5/2018 | |
| KR | 10-2018-0060502 | A | | 6/2018 | |
| KR | 101921063 | B1 | * | 11/2018 | A61C 13/0004 |
| KR | 10-2026025 | B1 | | 11/2019 | |

* cited by examiner 630
630
700
630
621
800
700
620
621

INITIAL LOCATION={X1, X2, X3, X4, X5, ·······························Xn}
TARGET LOCATION={T1, T2, T3, T4, T5,·······························Tn}
DISPLACEMENT={D1, D2, D3, D4, D5, ·······························.Dn}

ORAL IMAGE PROCESSING METHOD AND DATA PROCESSING DEVICE

CROSS REFERENCE TO RELATED APPLICATIONS

This application is a National Stage of International Application No. PCT/KR2022/015231 filed Oct. 10, 2022, claiming priority based on Korean Patent Application No. 10-2021-0134464 filed Oct. 8, 2021.

TECHNICAL FIELD

Disclosed embodiments relate to a method of processing an oral image and a data processing device. More specifically, the disclosed embodiments relate to a method and device for processing restoration data for a treatment target tooth selected from an oral image.

BACKGROUND ART

In dental treatments, in particular, dental prosthetic treatments, etc., dental computer-aided design/computer-aided manufacturing (CAD/CAM) technology has been widely used. In dental treatments using CAD/CAM, the most important thing is to obtain sophisticated three-dimensional (3D) data about a shape of a target object of a patient, such as a tooth, a gum, a jawbone, or the like. When conducting dental treatments, by using 3D data obtained from a target object, accurate calculation may be performed by a computer. For example, in dental CAD/CAM treatment processes, to obtain 3D data of a target object, methods such as computed tomography (CT), magnetic resonance imaging (MRI), optical scanning, etc. may be used.

When an oral image processing device obtains a 3D oral image from scan data, a user may select a target tooth for dental prosthesis from among teeth in the 3D oral image. Then, by using surface data of the selected target tooth, a tooth restoration may be designed.

In designing a tooth restoration using CAD/CAM, when a distance between the restoration and an adjacent tooth is too far, food may be stuck between the restoration and the adjacent tooth when the user chews the food, thereby causing a cavity, and when there are too many intersections between the restoration and the adjacent tooth, wearing of the restoration may be difficult. Accordingly, proper adaptation between the restoration and the adjacent tooth may be required.

DISCLOSURE

Technical Problem

Disclosed embodiments relate to a method and device for processing an oral image to provide proper adaptation between a tooth restoration and an adjacent tooth.

Technical Solution

A method of processing an oral image according to an embodiment includes displaying adjacent tooth data adjacent to preparation tooth data and restoration data for restoration of the preparation tooth data, receiving an input for adjusting adaptation between the restoration data and the adjacent tooth data, processing the adaptation between the restoration data and the adjacent tooth data in response to the received input, and displaying the restoration data adapted according to the processed adaptation.

The method of processing an oral image according to an embodiment may further include providing a user interface including a smart adaptation item, and in response to a user input of selecting the smart adaptation item, processing the restoration data such that the restoration data is adjacent to the adjacent tooth data and displaying the processed restoration data.

The processing of the adaptation according to an embodiment may include identifying a direction of a first ray directed in a direction perpendicular to an occlusal direction of the restoration data from a center of the restoration data and a direction of a second ray directed towards a point of the adjacent tooth data from a point at which the first ray meets the restoration data, and based on the direction of the first ray being identical to the direction of the second ray, determining that the restoration data does not intersect the adjacent tooth data, and based on the direction of the first ray being different from the direction of the second ray, determining that the restoration data intersects the adjacent tooth data.

The processing of the adaptation according to an embodiment may include, based on the restoration data not intersecting the adjacent tooth data, identifying a point of the restoration data at which a distance between the restoration data and the adjacent tooth data is minimum, and based on the identified point of the restoration data, transforming the restoration data by an amount corresponding to the received input.

The method of processing an oral image according to an embodiment may further include transforming the restoration data by using at least one of image morphing and mesh deformation.

The processing of the adaptation according to an embodiment may include, based on the restoration data intersecting the adjacent tooth data, identifying a point of the restoration data at which a distance between the restoration data and the adjacent tooth data is maximum, and based on the identified point of the restoration data, cutting the restoration data by an amount corresponding to the received input.

The method of processing an oral image according to an embodiment may further include cutting the restoration data by using a cutting tool used to remove a partial area of the restoration data.

A data processing device configured to process an oral image according to an embodiment includes a memory storing at least one instruction, and a processor configured to execute the at least one instruction stored in the memory, wherein, by executing the at least one instruction, the processor is further configured to display adjacent tooth data adjacent to preparation tooth data and restoration data for restoration of the preparation tooth data, receive an input for adjusting adaptation between the restoration data and the adjacent tooth data, process the adaptation between the restoration data and the adjacent tooth data in response to the received input, and display the restoration data adapted according to the processed adaptation.

Provided is a computer-readable recording medium having recorded thereon a program implemented to execute an oral image processing method by a computer according to an embodiment, wherein the oral image processing method includes displaying adjacent tooth data adjacent to preparation tooth data and restoration data for restoration of the preparation tooth data, receiving an input for adjusting adaptation between the restoration data and the adjacent tooth data, processing the adaptation between the restoration data and the adjacent tooth data in response to the received input, and displaying the restoration data adapted according to the processed adaptation.

Advantageous Effects

According to a method and device for processing an oral image disclosed in an embodiment, proper adaptation between a tooth restoration and an adjacent tooth may be provided.

According to a method and device for processing an oral image disclosed in an embodiment, a user interface which allows a user to simply adjust adaptation between a tooth restoration and an adjacent tooth may be provided.

According to a method and device for processing an oral image disclosed in an embodiment, proper adaptation between a tooth restoration and an adjacent tooth may be provided even in the absence of data about a preparation tooth by using data about a pre-preparation tooth.

DESCRIPTION OF DRAWINGS

The present disclosure may be easily understood by the following detailed description and accompanying drawings, and the reference numerals in the drawings denote structural elements.

BEST MODE

Mode for Invention

Figure 1:
FIG. 1 is a reference diagram illustrating generation of a prosthesis through tooth preparation according to embodiments.
Figure 1:
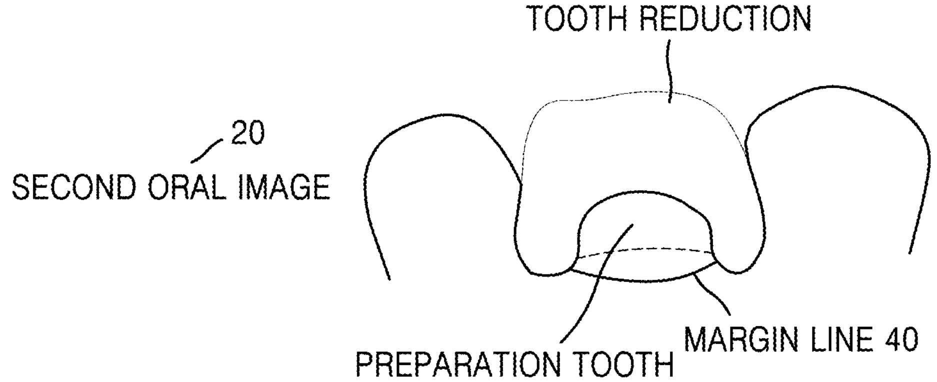
Figure 1:
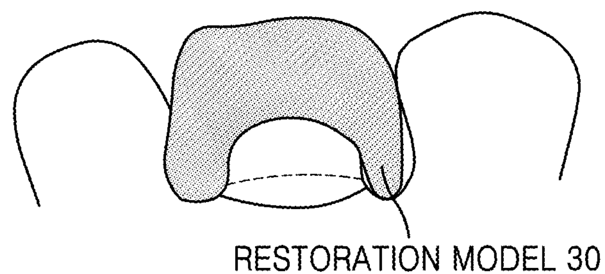

The present specification explains principles of the present invention and describes embodiments such that the scope of right of the present invention is clarified, and a person skilled in the art may perform the present disclosure. Disclosed embodiments may be implemented in various forms.

Throughout the specification, like reference numerals denote like components. The present specification does not necessarily describe all components, and general concepts in the pertinent or any redundant description between embodiments may be omitted. Throughout the present specification, such terms as “part” or “portion” used herein may be implemented as a software or a hardware, and in some embodiments, a plurality of portions may be implemented as a single unit or element, or a single portion may include a plurality of elements. Hereinafter, the operation principles and embodiments of the present disclosure are described by referring to the attached drawings.

In the present specification, an image may include an image showing at least one tooth or an oral cavity including at least one tooth (hereinafter, "oral image").

In addition, in the present specification, an image may be a two-dimensional (2D) image of an object or a 3D model or image sterically showing an object. Throughout the present specification, an image may refer to data required to express an object in 2D or 3D manner, for example, raw data obtained by at least one image sensor, etc. More specifically, the raw data may refer to data obtained to generate an oral image and may be data obtained by at least one image sensor included in an intraoral scanner during scanning of an oral cavity of a target patient by using the intraoral scanner (for example, 2D data).

Throughout the present specification, an "object" may include a tooth, a gum, at least a part of an oral cavity, and/or an artificial structure insertable into an oral cavity (for example, an orthodontic appliance, an implant, an artificial tooth, an orthodontic auxiliary tool, etc. inserted into an oral cavity).

Tooth preparation refers to a process of making a space for a planned restoration material by cutting a tooth through removal of dental erosion or a structurally unsound portion to restore an original shape and function of a restoration target tooth, and may be referred to as "prep."

A tooth before tooth preparation may be referred to as a pre-preparation tooth.

A tooth after tooth preparation may be referred to as a preparation tooth.

A tooth restoration may be manufactured outside an oral cavity based on preparation tooth data and may include an inlay, an onlay, a crown, a bridge, and a veneer. In general, a dental technician may manufacture a tooth restoration based on records provided by a dentist, and the manufactured tooth restoration may be permanently attached to a preparation tooth using dental cement. During preparation of a dental restoration, to maintain peripheral dental tissues, a temporary restoration may be used to cover a preparation tooth.

Hereinafter, embodiments will be described in detail with reference to the drawings.

FIG. 1 is a reference diagram illustrating generation of a prosthesis through tooth preparation according to embodiments.

Tooth preparation refers to a process of making a space for a planned restoration material by cutting a tooth through removal of dental erosion or a structurally unsound portion to restore an original shape and function of a restoration target tooth, and may be referred to as "prep."

A tooth before tooth preparation may be referred to as a pre-preparation tooth.

A tooth after tooth preparation may be referred to as a preparation tooth.

Referring to FIG. 1, a first oral image 10 may be an image obtained by scanning an oral cavity including a restoration target tooth before reduction, i.e., a pre-preparation tooth.

A second oral image 20 may be an image obtained by scanning an oral cavity including a tooth prepared by reduction of a restoration target tooth, i.e., a preparation tooth. From the preparation tooth in the second oral image 20, a margin line representing a boundary between a tooth and a prosthesis. In general, an end of a reduced part of a preparation tooth may be obtained as a margin line 40.

For example, a restoration such as a crown may be manufactured in a shape that is similar to a surface of a pre-preparation tooth, envelops a preparation tooth, and contacts with a preparation tooth at a margin line. To design such a restoration, surface data of a restoration target tooth of the first oral image may be required. The surface data may be recorded in the form of polygon mesh and may include location information of vertices of a surface of an object and connection relation among the vertices. Or, the surface data may be recorded in the form of point cloud and may include location information of vertices of a surface of an object.

To determine whether a restoration model generated according to the foregoing is properly generated in correspondence with a preparation tooth, the restoration model may be placed in the second oral image including the preparation tooth, and a relation with an adjacent tooth may be determined.

Figure 2:
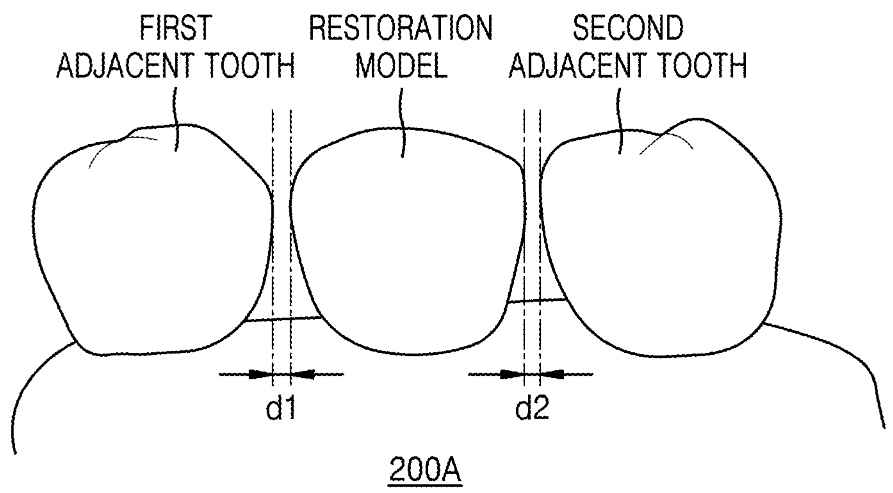
FIG. 2 is a reference diagram illustrating an intersection relation between a restoration model and an adjacent tooth.
Figure 2:
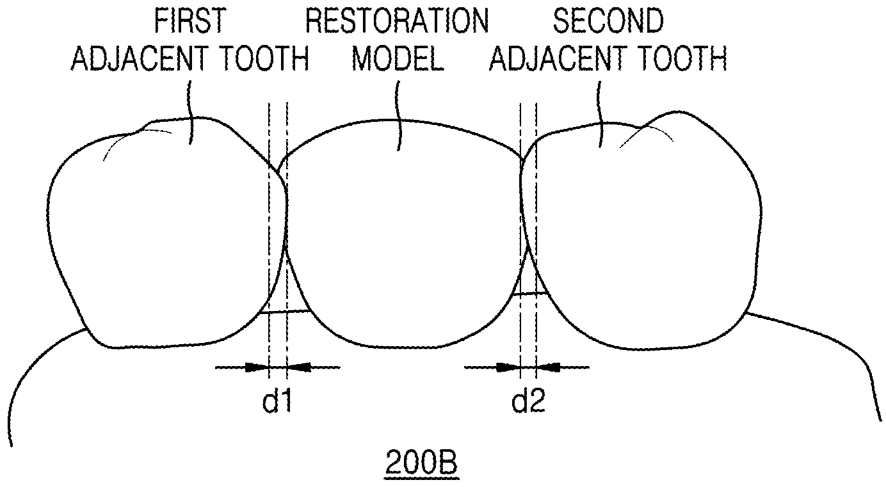
Figure 2:
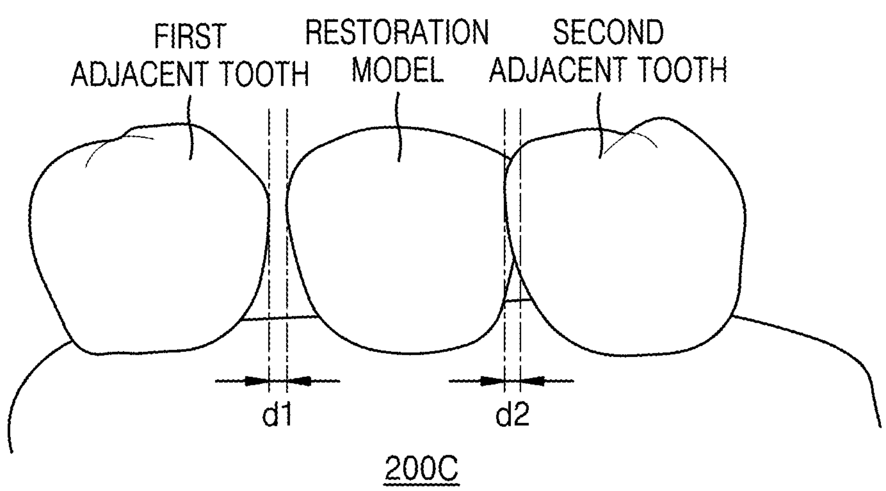

FIG. 2 is a reference diagram illustrating an intersection relation between a restoration model and an adjacent tooth.

The restoration model according to an embodiment may not intersect adjacent teeth.

200A of FIG. 2 illustrates a case in which the restoration model does not intersect a first adjacent tooth and a second adjacent tooth. In this case, the restoration model may be apart from the first adjacent tooth at a distance d1 and apart from the second adjacent tooth at a distance d2. As such, when the restoration model does not intersect the adjacent teeth and is apart from the adjacent teeth, it may be preferred to expand the restoration model by a certain distance such that the restoration model is adjacent to the adjacent teeth.

200B of FIG. 2 illustrates a case in which the restoration model intersects the first adjacent tooth and the second adjacent tooth. In this case, the restoration model may intersect the first adjacent tooth by the distance d1 and may intersect the second adjacent tooth by the distance d2. As such, when the restoration model intersects the adjacent teeth, it may be preferred to cut the restoration model by a certain distance such that the restoration model does not invade the adjacent teeth.

200C of FIG. 2 illustrates a case in which the restoration model does not intersect the first adjacent tooth and intersects the second adjacent tooth. In this case, the restoration model may be apart from the first adjacent tooth by the distance d1 and may intersect the second adjacent tooth by the distance d2. As such, when the restoration model does not intersects one adjacent tooth and intersects another adjacent tooth, the restoration model may be expanded by a certain distance towards the first adjacent tooth, which does not intersect the restoration model, and may also be cut by a certain distance against the second adjacent tooth, which intersects the restoration model, such that the restoration model is adjacent to the adjacent teeth.

According to the disclosed embodiments, when the restoration model does not intersect adjacent teeth, the restoration model may be expanded by a certain distance such that restoration model is adjacent to the adjacent teeth.

According to the disclosed embodiments, when the restoration model intersects adjacent teeth, the restoration model may be cut by a certain distance to prevent intersection between the restoration model and the adjacent teeth.

According to the disclosed embodiments, a user interface which allows a user to adjust the restoration model may be provided.

According to the disclosed embodiments, the restoration model may be adjusted only by a pre-preparation tooth without any preparation tooth.

Figure 3:
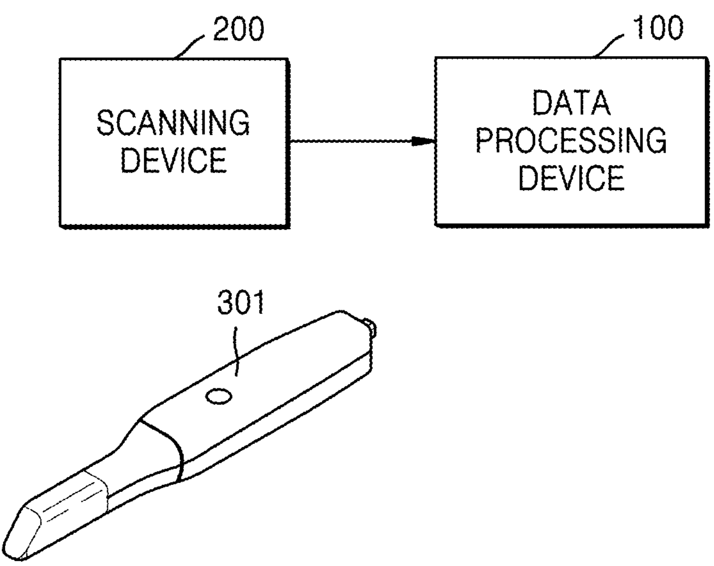
FIG. 3 is a diagram illustrating an oral model processing system according to a disclosed embodiment.

FIG. 3 is a diagram illustrating an oral model processing system according to a disclosed embodiment.

Referring to FIG. 3, an oral model processing system may include a scanning device 300 and a data processing device 100.

The scanning device 300 may be a device configured to scan an object, and the objet may include any target object or body part for scanning. For example, the object may include at least a part of patient's body including an oral cavity or face or a dental model. The scanning device may include a hand-held scanner grabbed by a user for scanning of an object, a model scanner scanning an installed dental model while moving around the dental model, etc.

For example, an intraoral scanner 301, which is one type of hand-held scanners may be a device inserted into an oral cavity and performing scanning of teeth in non-contact manner to obtain an image of the oral cavity including at least one tooth. In addition, the intraoral scanner 301 may have a shape which can be inserted into and taken out of an oral cavity and may scan the inside of the oral cavity of the patient by using at least one image sensor (for example, an optical camera, etc.) The intraoral scanner 301 may obtain surface information of an object as raw data for imaging of a surface of at least one of a tooth, a gum, and an artificial structure insertable into an oral cavity (for example, an orthodontic appliance including a bracket, a wire, etc., an implant, an artificial tooth, an orthodontic auxiliary tool inserted into an oral cavity, etc.) inside an oral cavity, which is an object. The intraoral scanner 301 may have a shape which may be easily inserted into and taken out of an oral cavity and is suitable for scanning the inside of oral cavity; however, the other body parts of the patient such as face, etc. may also be scanned by using the intraoral scanner 301.

The scanning device 300 may obtain image data by an optical triangulation method, a confocal method, etc.

The image data obtained by the scanning device 300 may be transmitted to the data processing device 100 connected through a wired or wireless communication network.

The data processing device 100 may be connected to the scanning device 300 through a wired or wireless communication network, and may be any electronic device configured to receive from the scanning device 300 a 2D image obtained by scanning an oral cavity and generate, display, and/or transmit an oral image based on the received 2D image.

Based on the 2D image data received from the scanning device 300, the data processing device 100 may generate at least one of information generated by processing the 2D image data and an oral image generated by processing the 2D image data and display the generated information and oral image on a display screen.

The data processing device 100 may be a computing device such as a smart phone, a laptop computer, a desktop computer, a PDA, a tablet PC, etc.; however, the present disclosure is not limited thereto.

In addition, the data processing device 100 may be in the form of a server for processing an oral image (or a server device).

The scanning device 300 may transmit raw data obtained by scanning to the data processing device 100. In this case, the data processing device 100 may generated a 3D oral image showing an oral cavity in 3D manner based on the received raw data. The "3D oral image" may be generated by 3D-modeling the inside of the oral cavity based on the received raw data, and thus, may be referred to as "3D oral model," "digital oral model," or "3D oral image." Hereinafter, a model or image showing an oral cavity in 2D or 3D manner may be referred to as "oral image."

The generated oral image may be analyzed, processed, displayed, and/or transmit to an external device by the data processing device 100.

In another embodiment, the scanning device 300 may obtain raw data through scanning, process the obtained raw data, generate an image corresponding to a target oral cavity, and transmit the image to the data processing device 100. In this case, the data processing device 100 may analyze, process, display, and/or transmit the received image.

In the described embodiments, the data processing device 100 may be an electronic device capable of generating and displaying an oral image showing an oral cavity including at least one tooth in 3D manner. Hereinafter, the data processing device 100 is described in detail.

According to an embodiment, the data processing device 100 may receive raw data of scanned oral cavity from the scanning device 300 and generate an oral image showing a 3D oral model by processing the received raw data. The raw data received from the scanning device 300 may include raw data representing teeth and raw data representing gums. Accordingly, the oral image generated by the data processing device 100 may include a teeth area representing teeth and a gum area representing gums.

According to an embodiment, the data processing device 100 may display adjacent tooth data adjacent to preparation tooth data and restoration data for restoration of the preparation tooth data.

According to an embodiment, the data processing device 100 may receive an input for adjusting adaptation between the restoration data and the adjacent tooth data.

According to an embodiment, the data processing device 100 may process adaptation between the restoration data and the adjacent tooth data in response to the received input and display the restoration data adapted according to the processed adaptation.

Figure 4:
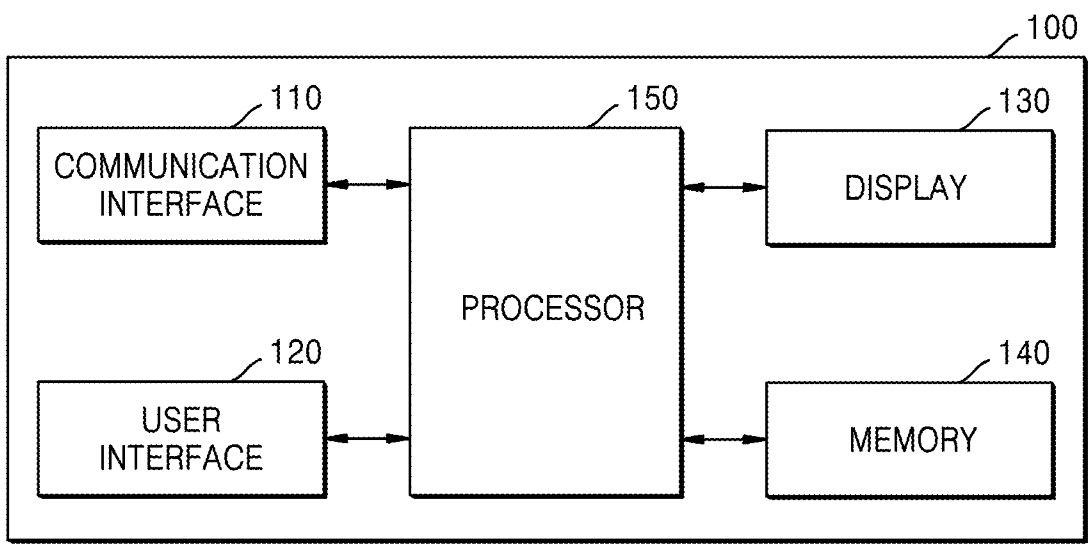
FIG. 4 is a block diagram illustrating a data processing device according to a disclosed embodiment.

FIG. 4 is a block diagram illustrating the data processing device 100 according to a disclosed embodiment.

Referring to FIG. 4, the data processing device 100 may include a communication interface 110, a user interface 120, a display 130, a memory 140, and a processor 150.

The communication interface 110 may perform communication with at least one external electronic device through a wired or wireless communication network. More specifically, the communication interface 110 may perform communication with the scanning device 300 according to control by the processor 150. The communication interface 110 may perform communication with an external electronic device or server connected through a wired or wireless communication network according to control by the processor.

The communication interface 110 may communicate with an external electronic device (for example, an intraoral scanner, a server, an external medical device, etc.) through a wired or wireless communication network. More specifically, the communication network may include at least one short-range communication module configured to perform communication according to the communication standards, such as bluetooth, Wifi, bluetooth low energy (BLE), NFC/RFID, Wifi direct, UWB, zigbee, etc.

In addition, the communication interface 110 may further include a long-distance communication module configured to perform communication with a server supporting long-distance communication according to the long-distance communication standards. More specifically, the communication interface 110 may include a long-distance communication module configured to perform communication through a network for internet communication. Moreover, the communication interface may include a long-distance communication module configured to perform communication through a communication network according to the communication standards such as 3G, 4G, and/or 5G.

Also, the communication interface 110 may include at least one port for connection to an electronic device through a wired cable to communicate with an external electronic device (for example, an intraoral scanner, etc.) Accordingly, the communication interface 110 may perform communication with an external electronic device cable-connected through at least one port.

The user interface 120 may receive a user input for control of the data processing device. The user interface 120 may include a user input device including a touch panel sensing a user touch, a button receiving a push by a user, a mouse or keyboard for designating or selecting a point on a user interface screen, etc.; however, the present disclosure is not limited thereto.

In addition, the user interface 120 may include a voice recognition device for voice recognition. For example, the voice recognition device may be a microphone and may receive a voice command or a voice request by a user. In response to this, the process may control an operation to be performed in correspondence to the voice command or the voice request.

The display 130 may display a screen. More specifically, the display 130 may display a certain screen according to control by the processor 150. The display 130 may display a user interface screen including an oral image generated based on data obtained through scanning an oral cavity of a user by the scanning device 300. Or, the display 130 may display a user interface screen including information about user's dental treatment history.

The memory 140 may store at least one instruction. The memory 140 may store at least one instruction executed by the processor. The memory may store at least one program executed by the processor 150. The memory 140 may store data received from the intraoral scanner (for example, raw data obtained by scanning an oral cavity). The memory may store an oral image showing an oral cavity in 3D manner.

The processor 150 may control execution of an intended operation by executing at least one instruction stored in the memory 140. The at least one instruction may be stored in the memory 140 included in the data processing device separately from an internal memory or a processor included in the processor 150.

More specifically, the processor 150 may control at least one component included in the data processing device to perform an intended operation by executing at least one instruction. Accordingly, even when a case where the processor performs certain operations is described as an example, it may mean that the processor controls at least one component included in the data processing device such that the certain operations are performed.

According to an embodiment, by executing at least one instruction stored in the memory 140, the processor 150 may display adjacent tooth data adjacent to preparation tooth data and restoration data for restoration of the preparation tooth data, receive an input for adjusting adaptation between the restoration data and the adjacent tooth data, process the adaptation between the restoration data and the adjacent tooth data in response to the received input, and shoe the restoration data adapted according to the processed adaptation.

According to an embodiment, by executing the at least one instruction stored in the memory 140, the processor 150 may provide a user interface including a smart adaptation item, in response to a user input of selecting the smart adaptation item, automatically process the restoration data such that the restoration data is adjacent to the adjacent tooth data, and display the processed restoration data.

According to an embodiment, by executing the at least one instruction stored in the memory 140, the processor 150 may identify a direction of a first ray directed in a direction perpendicular to an occlusal direction of the restoration data from a center of the restoration data and a direction of a second ray directed from a point at which the first ray meets the restoration data towards a point of the adjacent tooth data, and when the direction of the first ray is identical to the direction of the second ray, determine that the restoration data does not intersect the adjacent tooth data, and when the direction of the first ray is different from the direction of the second ray, determine that the restoration data intersects the adjacent tooth data.

According to an embodiment, by executing the at least one instruction stored in the memory 140, the processor 150 may, when the restoration data does not intersect the adjacent tooth data, identify a point of the restoration data at which a distance between the restoration data and the adjacent tooth data is minimum, and based on the identified point of the restoration data, transform the restoration data by an amount corresponding to the received input.

According to an embodiment, by executing the at least one instruction stored in the memory 140, the processor 150 may transform the restoration data by using at least one of image morphing and mesh deformation.

According to an embodiment, by executing the at least one instruction stored in the memory 140, the processor 150 may, when the restoration data intersects the adjacent tooth data, identify a point of the restoration data at which a distance between the restoration data and the adjacent tooth data is maximum, and based on the identified point of the restoration data, cut the restoration data by an amount corresponding to the received input.

According to an embodiment, by executing the at least one instruction stored in the memory 140, the processor 150 may cut the restoration data by using a cutting tool used to remove a partial area of the restoration data through Boolean subtraction.

According to an embodiment, the processor 150 may be internally implemented in a form including at least one internal processor and a memory device (e.g., random access memory (RAM), read-only memory (ROM), etc.) that stores at least one of programs, instructions, signals, and data to be processed or used by the internal processor.

In addition, the processor 150 may include a graphic processing unit (GPU) for graphic processing in correspondence with a video. The processor may be implemented as a system-on-chip (SoC) in which a core and a GPU are integrated. The processor may include at least a single core, for example, a multi-core. For example, the processor may include a dual-core, a triple-core, a quad-core, a hexa-core, a oxta-core, a deca-core, a dodeca-core, a hexadecimal core, etc.

In the disclosed embodiment, the processor 150 may generate an oral image based on a 2D image received from the scanning device 300.

More specifically, according to the control by the processor 150, the communication interface 110 may receive data obtained from the scanning device 300, for example, raw data obtained by scanning an oral cavity. Also, the processor 150 may generate a 3D oral image showing an oral cavity in 3D manner based on the raw data received from the communication interface. For example, the intraoral scanner may include at least one camera to restore the 3D image by optical triangulation and may include an L camera corresponding to a left field of view and an R camera corresponding to a right field of view according to an embodiment. The intraoral scanner may obtain L image data corresponding to the left field of view and R image data corresponding to the right field of view from the L camera and the R camera, respectively. The intraoral scanner (not shown) may transmit the raw data including the L image data and the R image data to the communication interface of the data processing device 100.

Then, the communication interface 110 may transmit the received raw data to the processor, and the processor may generate an oral image showing the oral cavity in 3D manner based on the received raw data.

The processor 150 may control the communication interface to directly receive an oral image showing the oral cavity in 3D manner from an external server, a medical device, etc. In this case, the processor may obtain a 3D oral image without generating a 3D oral image based on the raw data.

According to a disclosed embodiment, when the processor 150 is described as "extracting," "obtaining," "generating," etc., it means not only that the processor 150 executes at least one instruction to directly perform the aforementioned operations but also that the processor 150 controls other components to perform the aforementioned operations.

To implement the embodiments disclosed in the present disclosure, the data processing device 100 may include only some of components illustrated in FIG. 4 or may include other components in addition to the components illustrated in FIG. 4.

In addition, the data processing device 100 may store or execute a dedicated software connected to the intraoral scanner. The dedicated software may be referred to as a dedicated program, a dedicated tool, or a dedicated application. When the data processing device 100 operates in connection with the scanning device 300, the dedicated software stored in the data processing device 100 may be connected to the scanning device 300 and receive in real time data obtained by scanning an oral cavity. For example, for the intraoral scanner Medit i500, there may be a dedicated software for processing data obtained by scanning an oral cavity. More specifically, Medit has produced and distributed a software for processing, management, use, and/or transmission of data obtained from the intraoral scanner. In this regard, as the "dedicated software" refers to a program, tool, or application which operates in connection with an intraoral scanner, various intraoral scanners manufactured and sold by diverse manufacturers may share the dedicated software. In addition, the dedicated software may be produced and distributed separately from the intraoral scanner performing the scanning of the oral cavity.

The data processing device 100 may store and execute a dedicated software corresponding to an intraoral scanner product. The dedicated software may perform at least one operation for obtaining, processing, storing, and/or transmitting an oral image. The dedicated software may be stored in the processor. In addition, the dedicated software may provide a user interface for the use of data obtained from the intraoral scanner. The user interface screen provided by the dedicated software may include the oral image generated by the disclosed embodiments.

Figure 5:
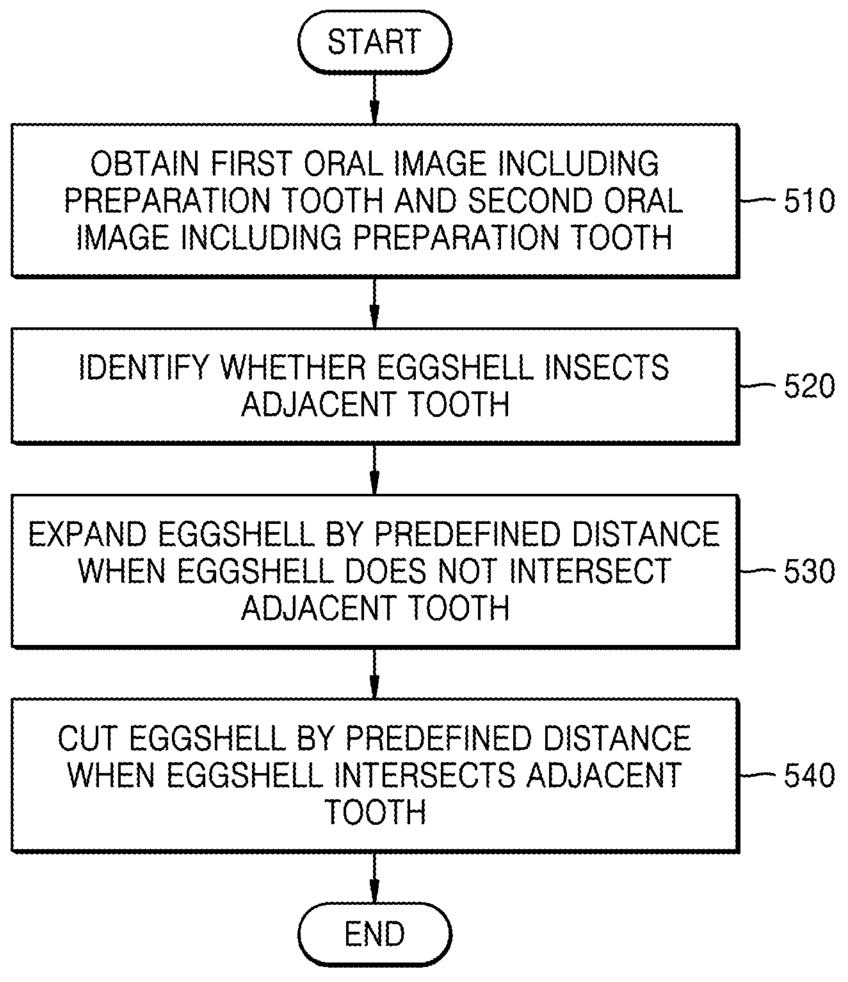
FIG. 5 is a flowchart illustrating a method by which a data processing device processes an oral image, according to an embodiment.

FIG. 5 is a flowchart illustrating a method by which a data processing device processes an oral image, according to an embodiment. The 3D oral model processing method illustrated in FIG. 5 may be performed by the data processing device 100. Accordingly, the 3D oral model processing method illustrated in the flowchart of FIG. 5 may describe operations of the data processing device 100.

Referring to FIG. 5, in operation 510, the data processing device 100 may obtain an oral image including preparation tooth data and an eggshell, which is external surface data of the restoration model.

According to an embodiment, the data processing device 100 may receive raw data obtained by scanning a dental model or an oral cavity including a pre-preparation tooth of a patient, i.e., a target tooth before processing, such as tooth reduction, etc. from the scanning device 300, and obtain an oral image including the pre-preparation tooth including a teeth area and a gum area by processing the received raw data. Or, the data processing device 100 may obtain an oral image including a pre-preparation tooth stored in a memory or a cloud server.

According to an embodiment, the data processing device 100 may receive raw data obtained by scanning a dental model or an oral cavity including a preparation tooth of a patient, i.e., a target tooth after processing, such as tooth reduction, etc. from the scanning device 300, and obtain an oral image including the preparation tooth including a teeth area and a gum area by processing the received raw data. Or, the data processing device 100 may obtain an oral image including a preparation tooth stored in the memory.

Figure 6:
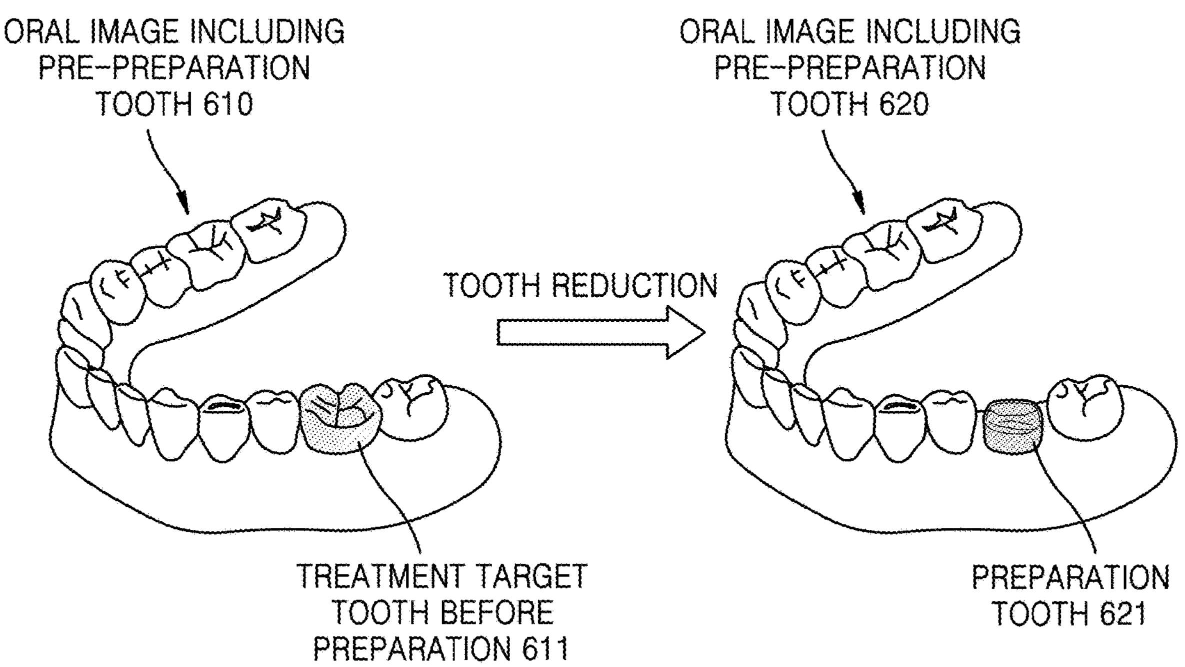
FIG. 6 is a diagram illustrating examples of an oral image including a pre-preparation tooth obtained by a data processing device and an oral image including a preparation tooth, according to an embodiment.

FIG. 6 is a diagram illustrating examples of an oral image including a pre-preparation tooth obtained by the data processing device 100 and an oral image including a preparation tooth, according to an embodiment.

Referring to FIG. 6, the data processing device 100 may obtain an oral image 610 including a pre-preparation tooth and an oral image 620 including a preparation tooth.

For example, when 2D data is obtained by using the intraoral scanner, the data processing device 100 may calculate coordinates of a plurality of illuminated surface points by using the triangulation method. As the intraoral scanner moves on and scans the surface of the object, the amount of scan data may increase, and coordinates of surface points may be accumulated. As a result of such obtaining of images, a point cloud of vertices may be identified to show a surface range. Points in the point cloud may represent actually measured points on the 3D surface of the object. The vertices adjacent to the point cloud may form a polygonal mesh connected by line segments for approximation. The polygonal mesh may be a trigonal mesh, a tetragonal mesh, a pentagonal mesh, etc. The relation between such mesh model and an adjacent polygon may be used to extract characteristics of dental boundary, for example, a curvature, a minimum curvature, an edge, a spatial relation, etc.

Referring to FIG. 6, a partial area 601 of the oral image 610 may include a plurality of vertices constituting a point cloud and a trigonal mesh generated by line-connecting adjacent vertices. The same goes for the oral image 620.

According to an embodiment, the data processing device 100 may obtain an eggshell which is external surface data of the restoration model.

The restoration model may refer to a model for generating an artificial attachment to be attached onto a preparation tooth for restoration of a treatment target tooth.

According to an embodiment, the data processing device 100 may obtain external surface data of the restoration model. The external surface data of the restoration model may be referred to as an eggshell.

Figure 7:
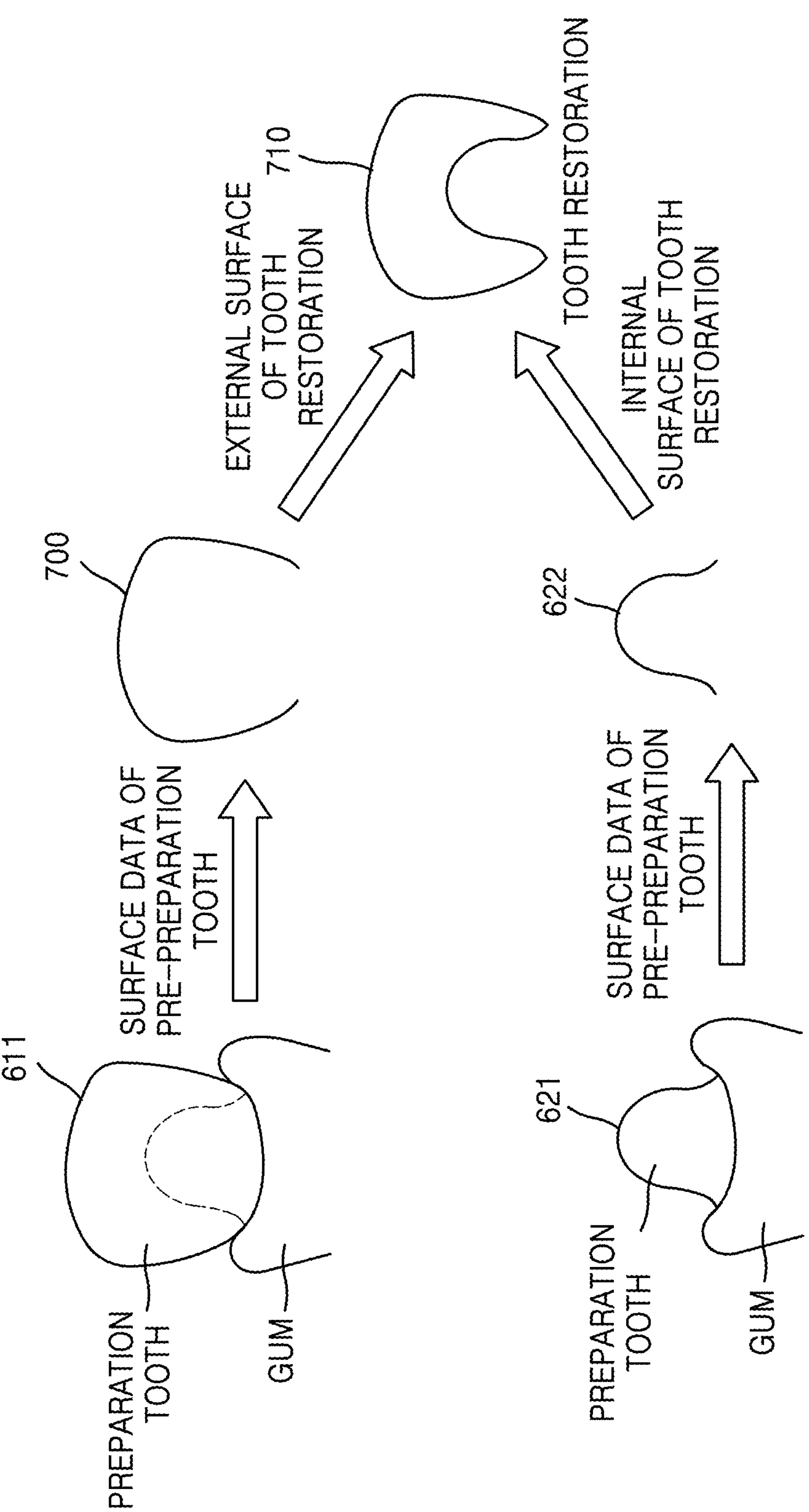
FIG. 7 is a reference diagram illustrating an example of a method of generating a tooth restoration model, according to an embodiment.

FIG. 7 is a reference diagram illustrating an example of a method of generating a tooth restoration model according to an embodiment.

Referring to FIG. 7, the data processing device 100 may generate external surface data of a tooth restoration based on surface data of an image of a pre-preparation tooth and generate internal surface data of the tooth restoration based on the surface data of the image of the preparation tooth.

The data processing device 100 may generate a tooth restoration model by connecting the external surface data of the tooth restoration and the internal surface of the tooth restoration.

The external surface data of the tooth restoration model may be referred to as an eggshell.

In the disclosed embodiments, the data processing device 100 may obtain the eggshell which is the external surface data of the tooth restoration model to identify intersection relation between the tooth restoration model and adjacent teeth. Hereinafter, the eggshell is described in detail. In the data processing device 100, the tooth restoration model may also be used to identify the intersection relation between the tooth restoration model and the adjacent teeth.

Referring back to FIG. 5, in operation 520, the data processing device 100 may identify whether the eggshell intersects the adjacent tooth.

According to an embodiment, the data processing device 100 may obtain the eggshell and target jaw data from which preparation tooth data is removed to identify intersection between the eggshell and the adjacent tooth.

Figure 8:
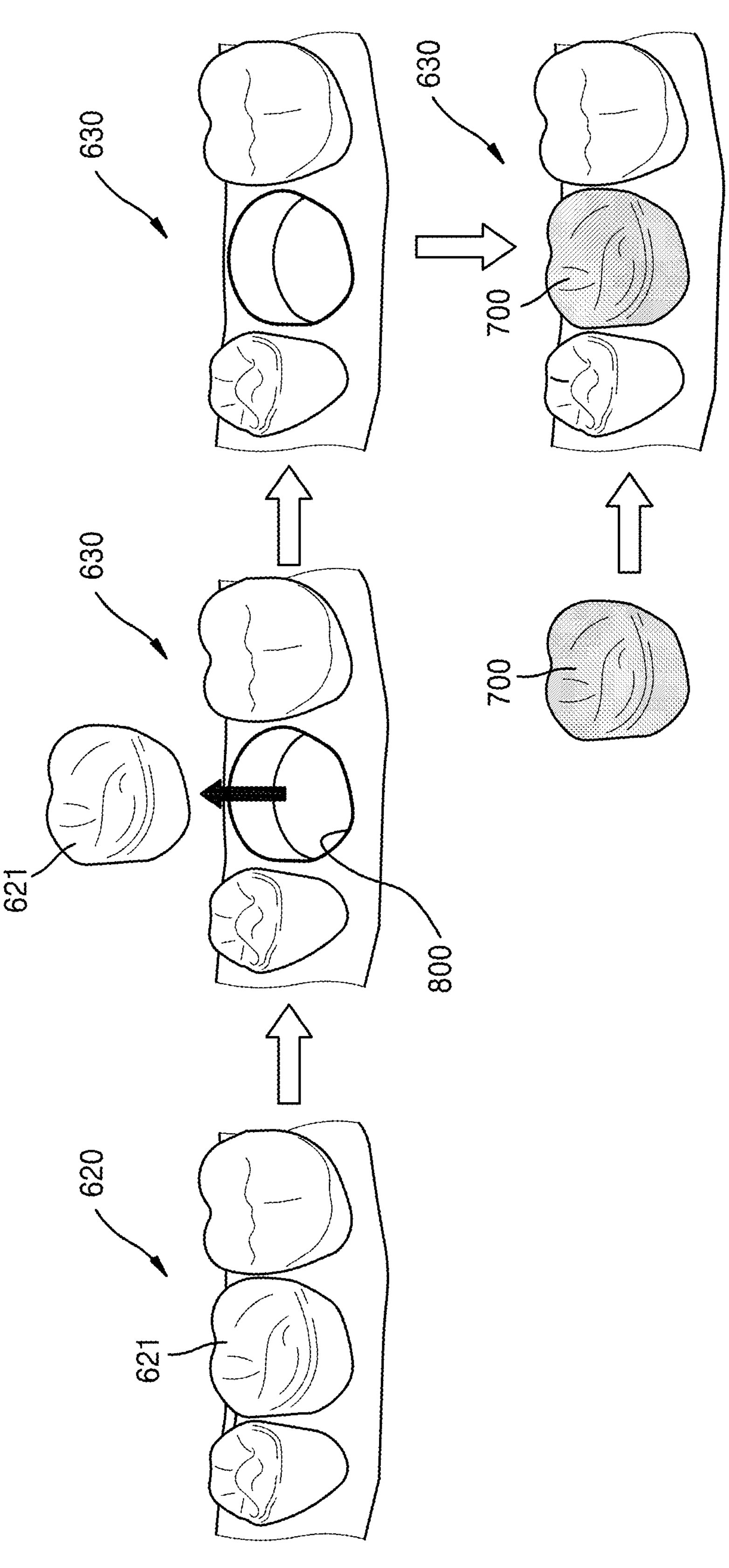
FIG. 8 is a diagram illustrating examples of target jaw data from which preparation tooth data is removed and an eggshell, according to an embodiment.

FIG. 8 is a diagram illustrating examples of target jaw data from which preparation tooth data is removed and an eggshell, according to an embodiment.

The data processing device 100 the oral image 620 including preparation tooth data 621 and by removing the preparation tooth data 621 according to a margin line 800 of the preparation tooth data 621 in the oral image 620, obtain an oral image 630 from which the preparation tooth data 621 is removed. The oral image 630 from which the preparation tooth data 621 is removed may be referred to as target jaw data.

In addition, the data processing device 100 may obtain an eggshell 700 generated in the same manner as illustrated in FIG. 7.

The data processing device 100 may identify whether the eggshell intersects the adjacent tooth based on target jaw data 630 and the eggshell 700.

Figure 9:
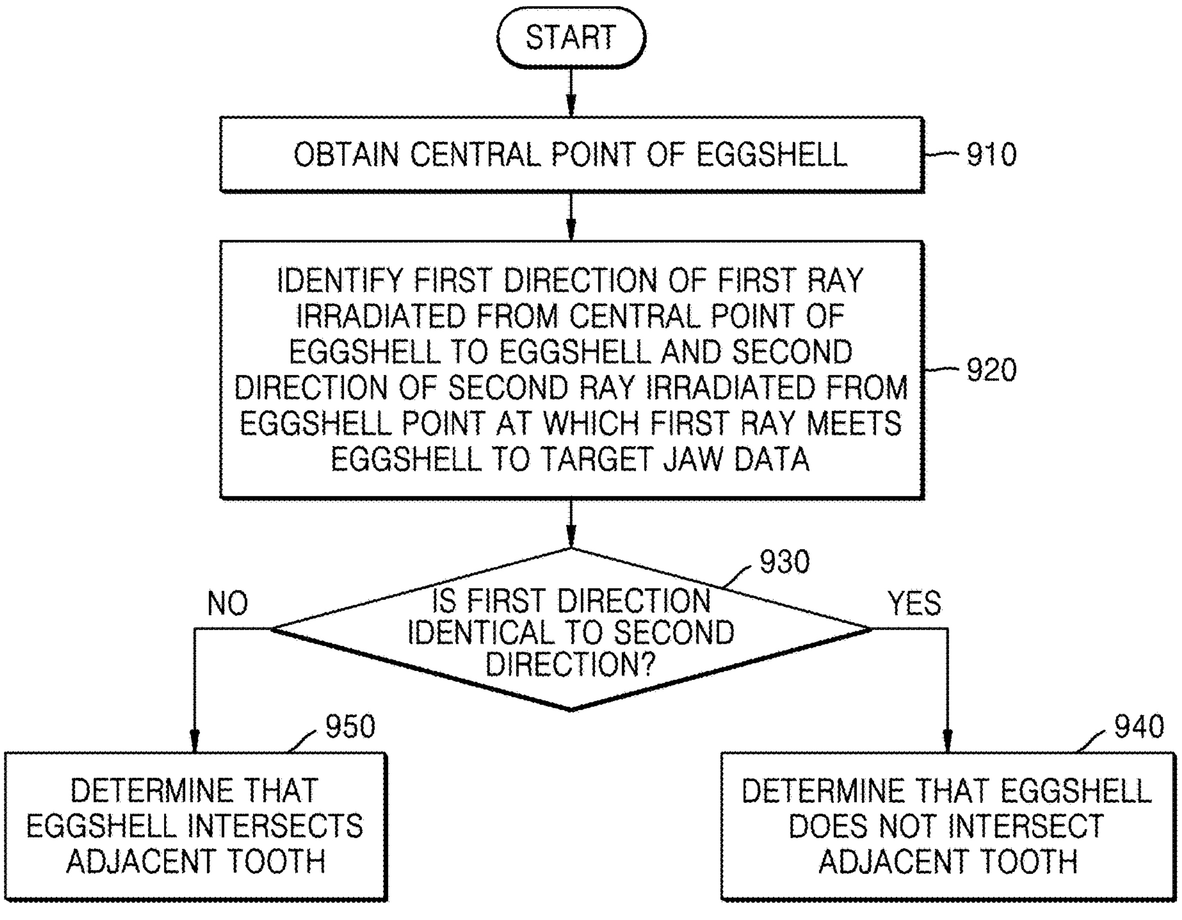
FIG. 9 is a flowchart illustrating an example of a method of identifying intersection between an eggshell and an adjacent tooth, according to an embodiment.

FIG. 9 is a flowchart illustrating an example of a method of identifying intersection between an eggshell and an adjacent tooth, according to an embodiment.

Referring to FIG. 9, in operation 910, the data processing device 100 may obtain a central point of the eggshell.

Figure 10:
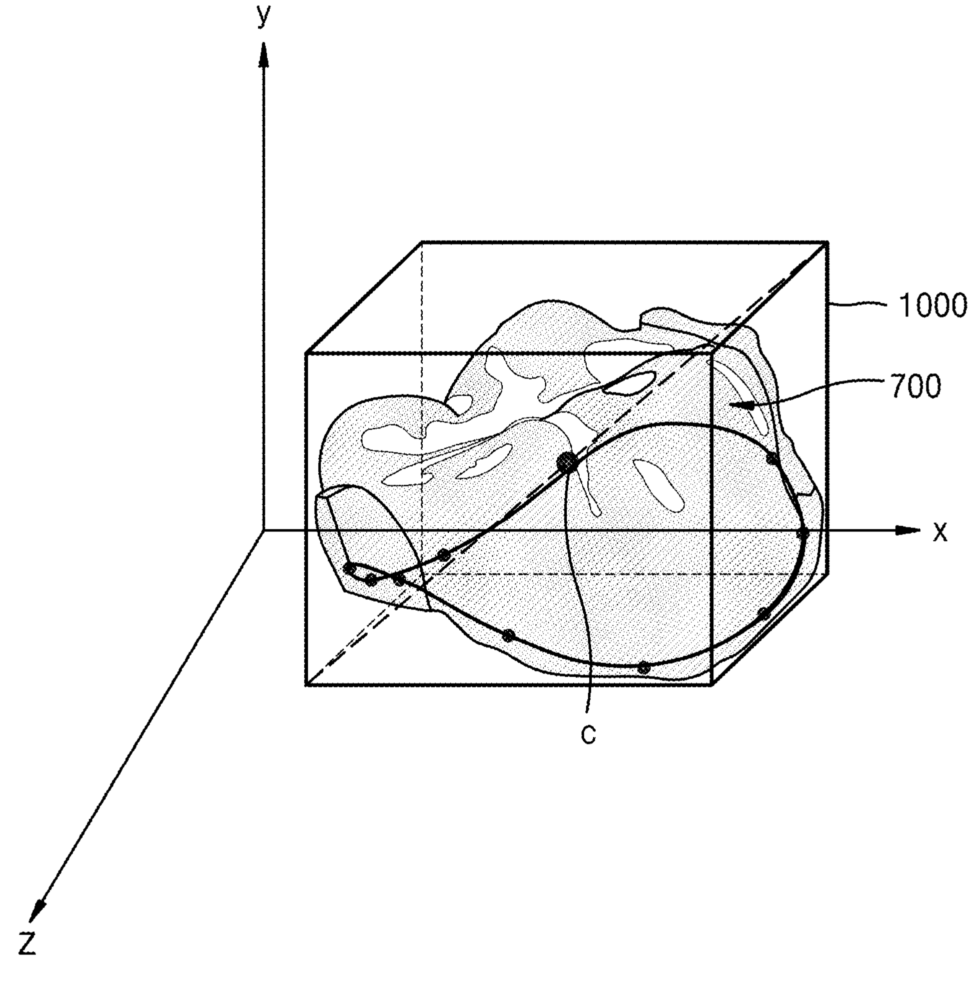
FIG. 10 is a reference diagram illustrating an example of locating a central point of an eggshell, according to an embodiment.

FIG. 10 is a reference diagram illustrating an example of locating a central point of an eggshell, according to an embodiment.

Referring to FIG. 10, the data processing device 100 may generate a bounding box 1000 based on the eggshell 700. The bounding box 1000 may have a rectangular shape including min points and max points of the eggshell 700 connected to each other, and a diagonal center of such rectangular shape may be determined as a central point c of the eggshell 700.

In operation 920, the data processing device 100 may identify the first direction of the first ray irradiated from the central point of the eggshell towards the eggshell and the second direction of the second ray irradiated from the eggshell point at which the first ray meets the eggshell towards the target jaw data.

Figure 11:
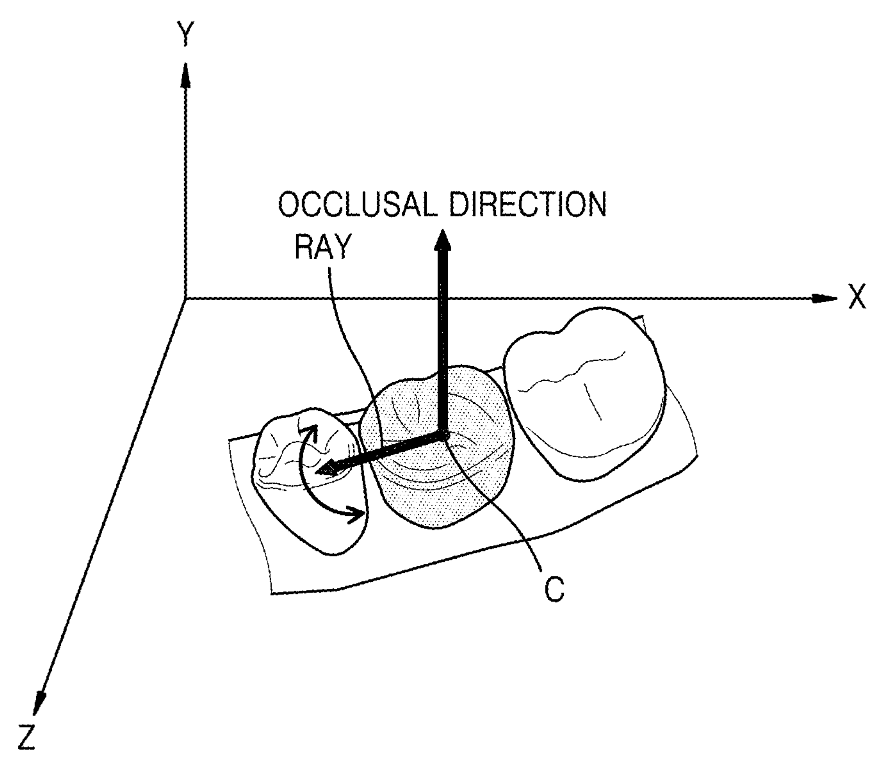
FIG. 11 is a reference diagram illustrating an occlusal direction of an eggshell and a ray, according to an embodiment.

FIG. 11 is a reference diagram illustrating an occlusal direction of an eggshell and a ray, according to an embodiment.

Referring to FIG. 11, the data processing device 100 may find an occlusal direction of the eggshell, i.e., a direction in which an upper jaw and a lower jaw occlude. The occlusal direction of the eggshell may be an average value of all face (mesh) area normals constituting the eggshell. The face area normal may be a value obtained by multiplying a face normal by a corresponding face area. When the occlusal direction obtained according to the above is the Y axis, the data processing device 100 may identify a direction of a ray irradiated through 360° rotation in the direction perpendicular to the occlusal direction from points in the Y axis direction with respect to the central point C(Xa,Y0,Zb) of the eggshell 700, that is, for example, P1(Xa,Y1,Zb), P2(Xa,Y2,Zb), P3(Xa,Y3,Zb), etc. More specifically, the data processing device 100 may obtain the first direction of the first ray irradiated from the central point of the eggshell 700 towards the eggshell. In addition, the data processing device 100 may identify the second direction of the second ray irradiated from a point p1 of the eggshell at which the first ray meets the eggshell towards a point p2 of the target jaw data.

In operation 930, the data processing device 100 may determine whether the first direction is identical to the second direction.

In operation 940, when the first direction is identical to the second direction, the data processing device 100 may determine that the eggshell does not intersect the adjacent tooth.

In operation 950, when the first direction is different from the second direction, the data processing device 100 may determine that the eggshell intersects the adjacent tooth.

Determination of the intersection between the eggshell and the adjacent tooth is described in detail in relation to FIGS. 12 to 21.

Figure 12:
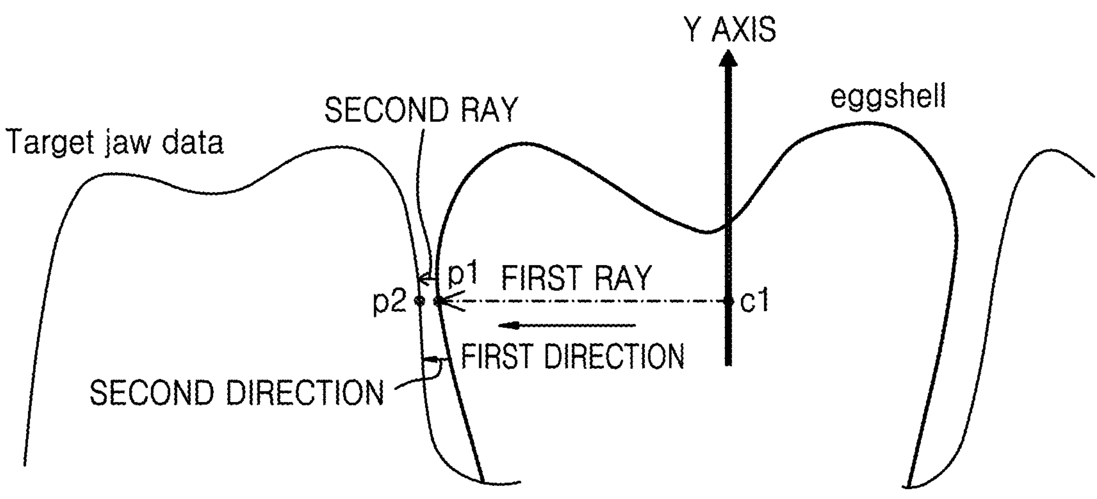
FIG. 12 is a diagram illustrating a case in which a first direction of a first ray is identical to a second direction of a second ray, according to an embodiment.

FIG. 12 is a diagram illustrating a case in which the first direction of the first ray is identical to the second direction of the second ray, according to an embodiment.

Referring to FIG. 12, the ray irradiated in the direction perpendicular to the y axis direction from the central point C1 of the eggshell may be defined as a first ray. The point P1 at which the first ray irradiated from the central point C1 meets the eggshell may be defined as P1. Then, the data processing device 100 may identify the first direction of the first ray irradiated from C1 to P1. Moreover, when the second ray is irradiated from the eggshell point at which the first ray meets the eggshell towards the target jaw data, the point at which the second ray meets the target jaw data may be defined as P2, and the second direction of the second ray irradiated from P1 to P2 may be identified. In FIG. 12, the first direction of the first ray is identical to the second direction of the second ray. As such, when the first direction of the first ray is identical to the second direction of the second ray, the data processing device 100 may determine that the eggshell does not intersect the adjacent tooth.

Figure 13:
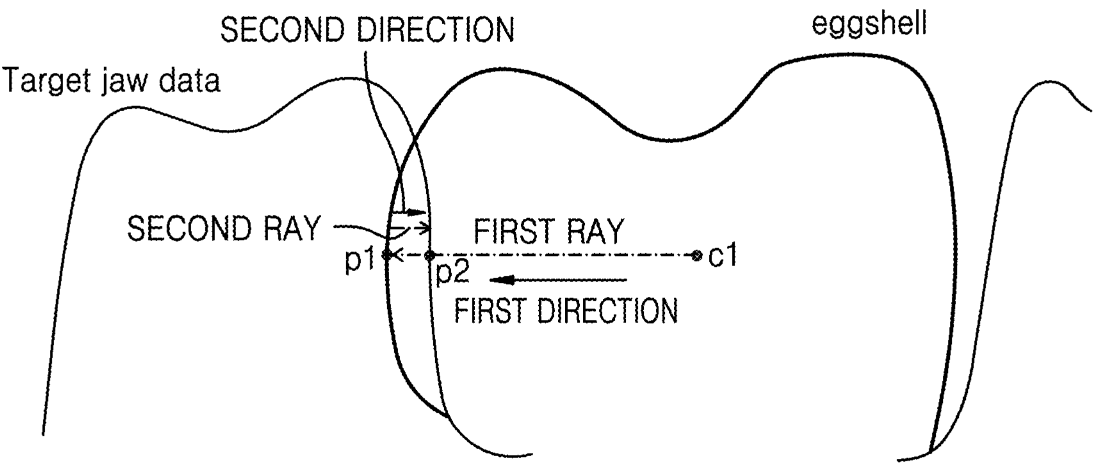
FIG. 13 is a diagram illustrating a case in which a first direction of a first ray is different from a second direction of a second ray, according to an embodiment.

FIG. 13 is a diagram illustrating a case in which the first direction of the first ray is different from the second direction of the second ray, according to an embodiment.

Referring to FIG. 13, the ray irradiated in the direction perpendicular to the y axis direction from the central point C1 of the eggshell may be defined as a first ray. The point P1 at which the first ray irradiated from the central point C1 meets the eggshell may be defined as P1. Then, the data processing device 100 may identify the first direction of the first ray irradiated from C1 to P1. Moreover, when the second ray is irradiated from the eggshell point at which the first ray meets the eggshell towards the target jaw data, the point at which the second ray meets the target jaw data may be defined as P2, and the second direction of the second ray irradiated from P1 to P2 may be identified. In FIG. 13, the first direction of the first ray is different from the second direction of the second ray. As such, when the first direction of the first ray is different from the second direction of the second ray, the data processing device 100 may determine that the eggshell intersects the adjacent tooth.

Referring back to FIG. 5, in operation 530, when the eggshell does not intersect the adjacent tooth, the data processing device 100 may expand the eggshell by a certain distance. When there is no intersection between the eggshell and the adjacent tooth, as this means that the eggshell is apart from the adjacent tooth, by expanding the eggshell by a distance therebetween, the eggshell may become adjacent to the adjacent tooth.

In operation 540, when there is intersection between the eggshell and the adjacent tooth, the data processing device 100 may cut the eggshell by a certain distance. When there is intersection between the eggshell and the adjacent tooth, as this means that the eggshell and the adjacent tooth invade each other, by cutting the eggshell by a distance of invasion, the eggshell may become adjacent to the adjacent tooth.

According to an embodiment, when there is no intersection between the eggshell and the adjacent tooth, the data processing device 100 may find points corresponding to a minimum distance between the eggshell and the adjacent tooth, and based on the points corresponding to the minimum distance, expand the eggshell by the minimum distance. The reason why the minimum distance is used as a basis is because otherwise there may be intersection between the eggshell and the adjacent tooth.

Figure 14:
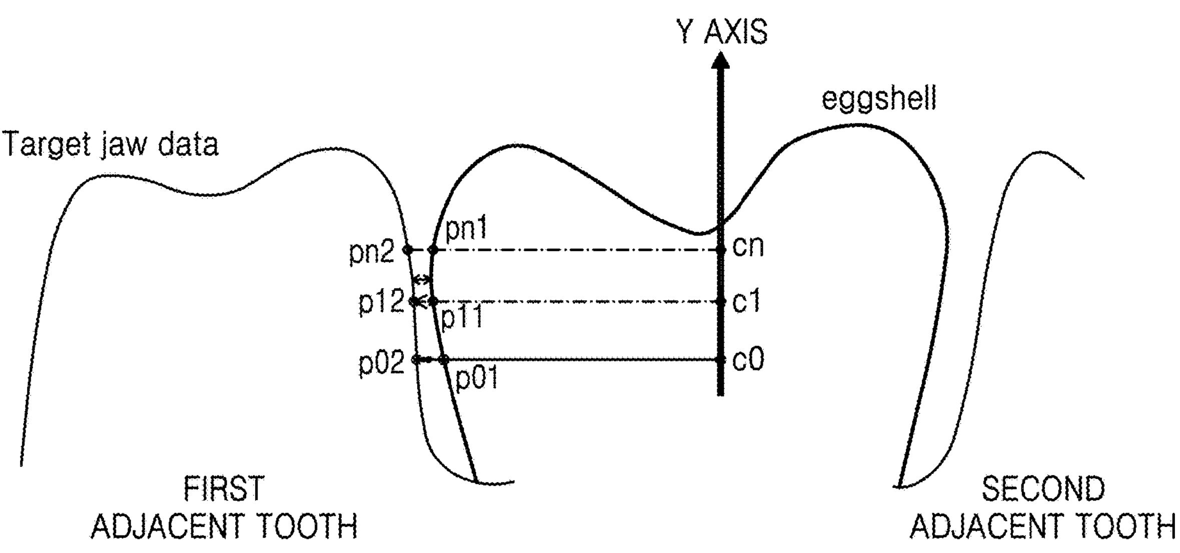
FIG. 14 is a reference diagram illustrating a method of finding a minimum distance between an eggshell and an adjacent tooth when there is no intersection between the eggshell and the adjacent tooth, according to an embodiment.

FIG. 14 is a reference diagram illustrating a method of finding a minimum distance between an eggshell and an adjacent tooth when there is no intersection between the eggshell and the adjacent tooth, according to an embodiment.

Referring to FIG. 14, the data processing device 100 may find points p1 and p2 at which the distance between the eggshell and the target jaw data corresponding to the first adjacent tooth is minimum by irradiating a 360° ray in the X axis direction perpendicular to the Y axis direction while the central point moves in the Y axis direction, which is the occlusal direction, starting from the central point c0 of the eggshell. That is, the data processing device 100 may irradiate a 360° ray in the X axis direction perpendicular to the Y axis direction while the central point moves in the Y axis direction starting from the central point c0 of the eggshell, followed by c1, c2, . . . cn to find a point pn1 at which the ray meets the eggshell in correspondence to each central point (c0, c1, c2, . . . cn) and a point pn2 at which the ray meets the target jaw data, i.e., (p01, p02), (p11, p12), (p21, p22), . . . (pn1, pn2). The data processing device 100 may identify points at which a distance between pn1 and pn2 is minimum, from among the points. For example, as illustrated in FIG. 14, according to the ray irradiated from c1, (p11, p12) may be identified as points at which a distance between the eggshell and the target jaw data corresponding to the first adjacent tooth is minimum. In this manner, the data processing device 100 may identify points at which the distance between the eggshell and the first adjacent tooth is minimum.

Then, the data processing device 100 may irradiate a ray in a certain angle range in a direction opposite to the points at which the distance between the eggshell and the target jaw data corresponding to the first adjacent tooth is minimum to determine whether the eggshell intersects the second adjacent tooth, and when there is no intersection, find points at which the distance between the eggshell and the target jaw data corresponding to the second adjacent tooth is minimum. In this manner, the data processing device 100 may identify points at which the distance between the eggshell and the second adjacent tooth is minimum.

Figure 15:
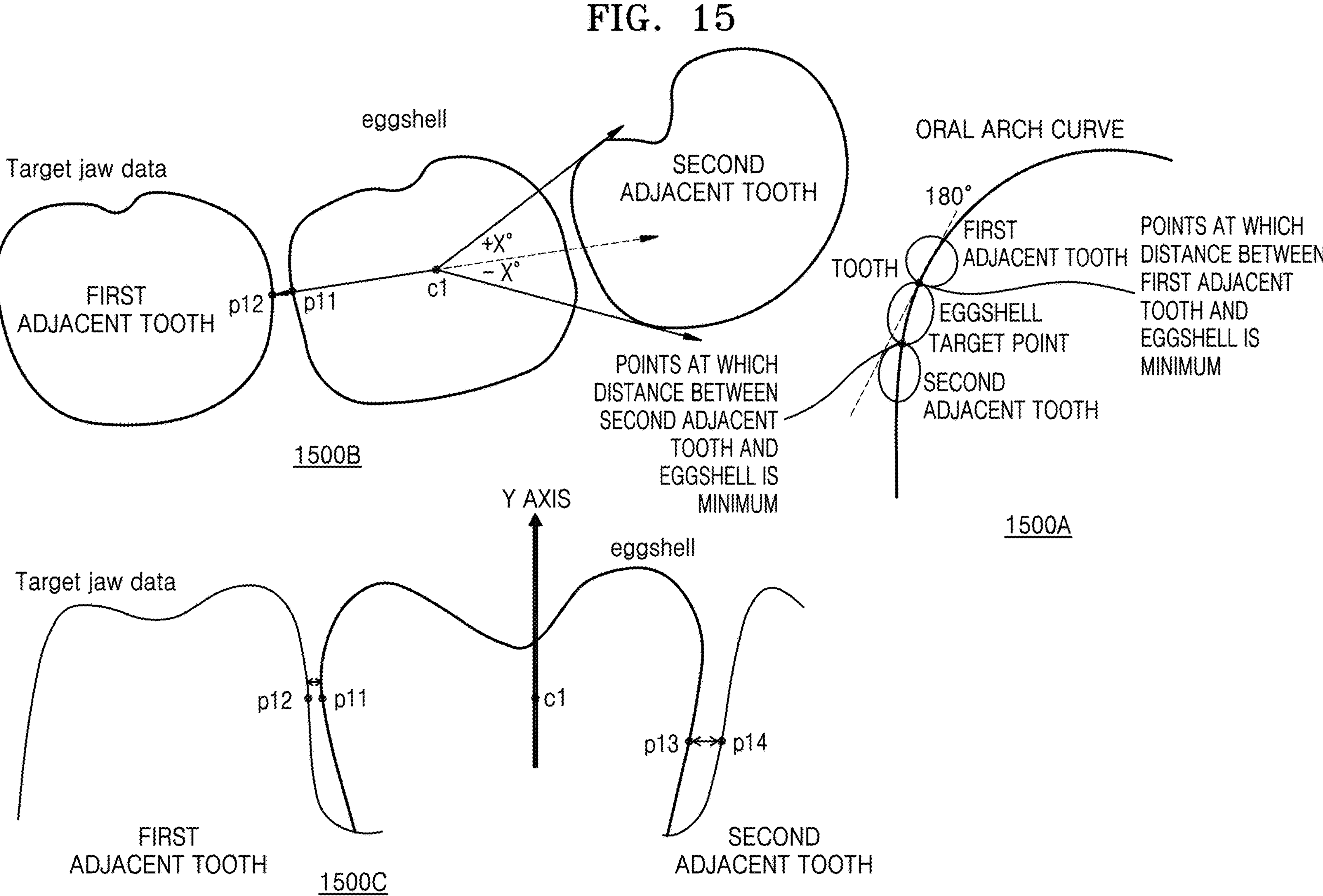
FIG. 15 is a reference diagram illustrating a method of finding a minimum distance between an eggshell and a second adjacent tooth when there is no intersection between the eggshell and the adjacent tooth, according to an embodiment.

FIG. 15 is a reference diagram illustrating a method of finding a minimum distance between an eggshell and a second adjacent tooth when there is no intersection between the eggshell and the adjacent tooth, according to an embodiment. 1500A of FIG. 15 illustrates an example of an oral arch curve. Referring to 1500A of FIG. 15, teeth on an oral arch curve are likely to be located at an angle less than 180°. Accordingly, based on the points at which the distance between the first adjacent tooth and the eggshell is minimum, the points at which the distance between the second adjacent tooth and the eggshell is minimum may be likely to be located at an angle less than 180° other than 180°. Thus, it may be preferred to find the points at which the distance between the second adjacent tooth and the eggshell is minimum in a certain angle range based on 180°.

1500B of FIG. 15 is a diagram of the target jaw data and the eggshell seen on an occlusion surface. Referring to 1500B of FIG. 15, when finding the point at which the distance between the second adjacent tooth and the eggshell is minimum by using the point (P11, P12) at which the distance between the first adjacent tooth and the eggshell is minimum, the data processing device 100 may find a point having the minimum distance in a certain angle range (+x°, −x°) in a direction forming 180° with the point (P11, P12). For example, the certain angle may be +60° and −60°. The data processing device 100 may find points at which the distance between the eggshell and the second adjacent tooth is minimum by irradiating a ray in the certain angle range.

Referring to 1500C of FIG. 15, the data processing device 100 may display found points (P13, P14) at which the distance between the eggshell and the second adjacent tooth is minimum.

Figure 16:
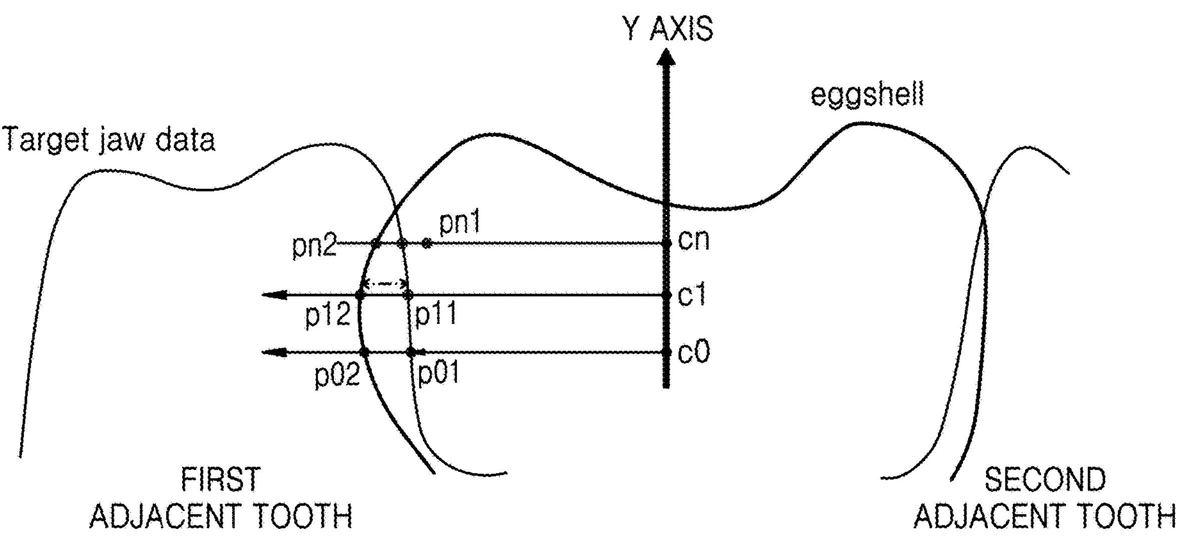
FIG. 16 is a reference diagram illustrating a method of finding a maximum distance between an eggshell and an adjacent tooth when there is an intersection between the eggshell and the adjacent tooth, according to an embodiment.

FIG. 16 is a reference diagram illustrating a method of finding a maximum distance between an eggshell and an adjacent tooth when there is an intersection between the eggshell and the adjacent tooth, according to an embodiment.

Referring to FIG. 16, the data processing device 100 may find points p11 and p12 at which the distance between the eggshell and the target jaw data is minimum by irradiating a 360° ray in the X axis direction perpendicular to the Y axis direction while the central point moves in the Y axis direction, which is the occlusal direction, starting from the central point c0 of the eggshell. That is, the data processing device 100 may irradiate a 360° ray in the X axis direction perpendicular to the Y axis direction while the central point moves in the Y axis direction starting from the central point c0 of the eggshell, followed by c1, c2, . . . cn to find a point pn1 at which the ray meets the eggshell in correspondence to each central point (c0, c1, c2, . . . cn) and a point pn2 at which the ray meets the target jaw data corresponding to the first adjacent tooth, i.e., (p01, p02), (p11, p12), (p21, p22), . . . (pn1, pn2). The data processing device 100 may identify points at which the distance between pn1 and pn2 is maximum, from among the points. For example, as illustrated in FIG. 16, (p11, p12) may be identified as points at which the distance between the eggshell and the target jaw data is maximum. In this manner, the data processing device 100 may identify points at which the distance between the eggshell and the first adjacent tooth is maximum.

Then, the data processing device 100 may irradiate a ray in a certain angle range in a direction opposite to the points at which the distance between the eggshell and the target jaw data corresponding to the first adjacent tooth is maximum to determine whether the eggshell intersects the second adjacent tooth, and when there is intersection, find points at which the distance between the eggshell and the target jaw data corresponding to the second adjacent tooth is maximum. In this manner, the data processing device 100 may identify points at which the distance between the eggshell and the second adjacent tooth is maximum.

Figure 17:
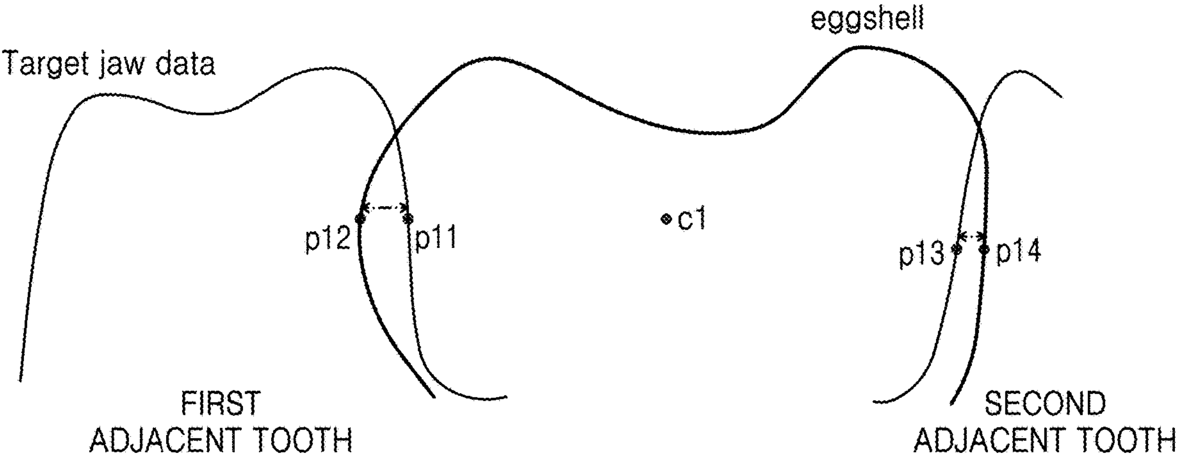
FIG. 17 is a reference diagram illustrating a method of finding a minimum distance between an eggshell and a second adjacent tooth when there is no intersection between the eggshell and the adjacent tooth, according to an embodiment.

FIG. 17 is a reference diagram illustrating a method of finding a minimum distance between an eggshell and a second adjacent tooth when there is no intersection between the eggshell and the adjacent tooth, according to an embodiment.

Referring to FIG. 17, when finding the point at which the distance between the second adjacent tooth and the eggshell is minimum by using the point (P11, P12) at which the distance between the first adjacent tooth and the eggshell is minimum, the data processing device 100 may find a point having the minimum distance in a certain angle range (+x°,−x°) in a direction forming 180° with the point (P11, P12). For example, the certain angle may be +60° and −60°. The data processing device 100 may find points at which the distance between the eggshell and the second adjacent tooth is maximum by irradiating a ray in the certain angle range. Referring to FIG. 17, the data processing device 100 may display found points (P13, P14) at which the distance between the eggshell and the second adjacent tooth is maximum.

Figure 18:
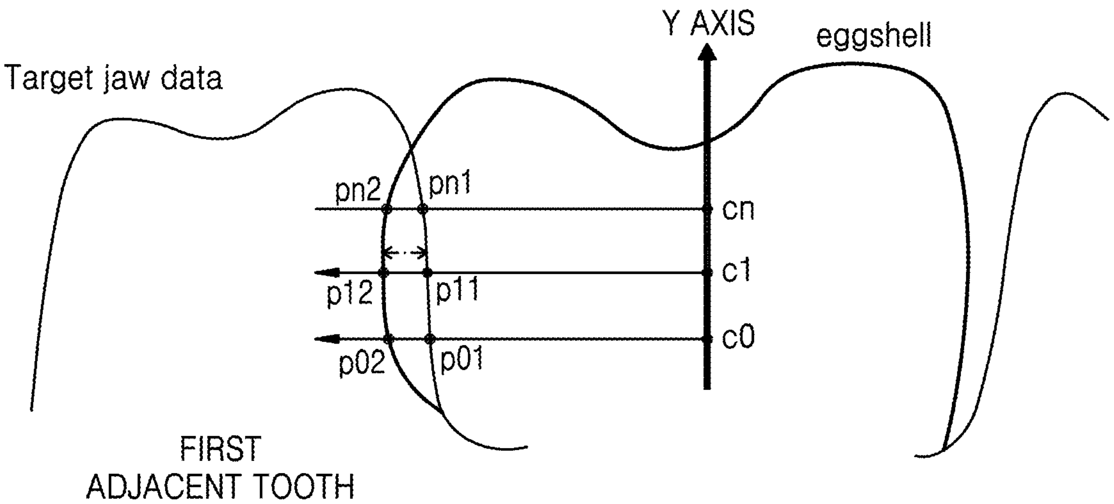
FIG. 18 is a reference diagram illustrating a method of finding a minimum distance between an eggshell and an adjacent tooth when there is no intersection between the eggshell and the adjacent tooth, according to an embodiment.

FIG. 18 is a reference diagram illustrating a method of finding a minimum distance between an eggshell and an adjacent tooth when there is no intersection between the eggshell and the adjacent tooth, according to an embodiment.

Referring to FIG. 18, the data processing device 100 may find points p1 and p2 at which the distance between the eggshell and the target jaw data is minimum by irradiating a 360° ray in the X axis direction perpendicular to the Y axis direction while the central point moves in the Y axis direction, which is the occlusal direction, starting from the central point c0 of the eggshell. That is, the data processing device 100 may irradiate a 360° ray in the X axis direction perpendicular to the Y axis direction while the central point moves in the Y axis direction starting from the central point c0 of the eggshell, followed by c1, c2, . . . cn to find a point pn1 at which the ray meets the eggshell in correspondence to each central point (c0, c1, c2, . . . cn) and a point pn2 at which the ray meets the target jaw data, i.e., (p01, p02), (p11, p12), (p21, p22), . . . (pn1, pn2). The data processing device 100 may identify points at which a distance between pn1 and pn2 is minimum, from among the points. For example, as illustrated in FIG. 18, (p11, p12) may be identified as points at which the distance between the eggshell and the target jaw data is minimum. In this manner, the data processing device 100 may identify points at which the distance between the eggshell and the first adjacent tooth is minimum.

Next, the data processing device 100 may determine whether the eggshell intersects the second adjacent tooth by irradiating a ray in a certain angle range in a direction opposite to the points at which the distance between the eggshell and the target jaw data is minimum. In FIG. 18, as the eggshell does not intersect the target jaw data constituting the second adjacent tooth, the data processing device 100 may find points at which the distance between the eggshell and the target jaw data constituting the second adjacent tooth is maximum. In this manner, the data processing device 100 may identify points at which the distance between the eggshell and the second adjacent tooth is maximum.

Figure 19:
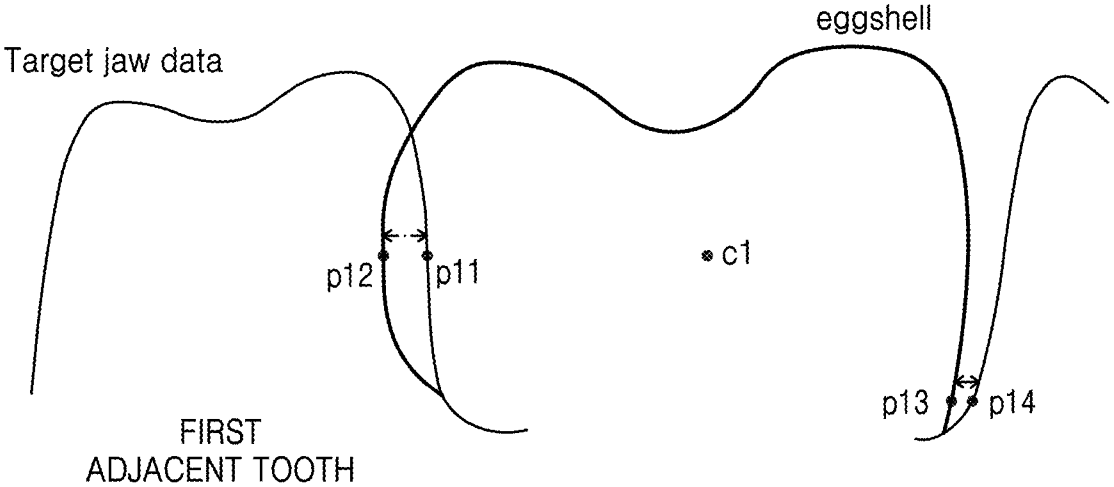
FIG. 19 is a reference diagram illustrating a method of finding a minimum distance between an eggshell and a second adjacent tooth when there is no intersection between the eggshell and the second adjacent tooth, according to an embodiment.

FIG. 19 is a reference diagram illustrating a method of finding a minimum distance between an eggshell and a second adjacent tooth when there is no intersection between the eggshell and the second adjacent tooth, according to an embodiment.

Referring to FIG. 19, when finding the point at which the distance between the second adjacent tooth and the eggshell is minimum by using the point (P11, P12) at which the distance between the first adjacent tooth and the eggshell is minimum, the data processing device 100 may find a point having the minimum distance in a certain angle range (+x°,−x°) in a direction forming 180° with the point (P11, P12). For example, the certain angle may be +60° and −60°. The data processing device 100 may find points at which the distance between the eggshell and the second adjacent tooth is maximum by irradiating a ray in the certain angle range. Referring to FIG. 19, the data processing device 100 may display found points (P13, P14) at which the distance between the eggshell and the second adjacent tooth is maximum.

According to and embodiment, when the target jaw data does not intersect the eggshell, as described above, the data processing device 100 may find the points at which the distance between the target jaw data and the eggshell is minimum, and based on the points at which the distance between the target jaw data and the eggshell is minimum, expand and move the eggshell. When expanding and moving the eggshell, for example, image morphing or mesh deformation may be used. For example, as the image morphing or mesh deformation, techniques such as triangulation of a scattered point set, linear triangular interpolation, Shepard's method, radial basis functions interpolation, multi-resolution (or multi-level) radial basis functions interpolation, etc. may be used.

Figure 20:
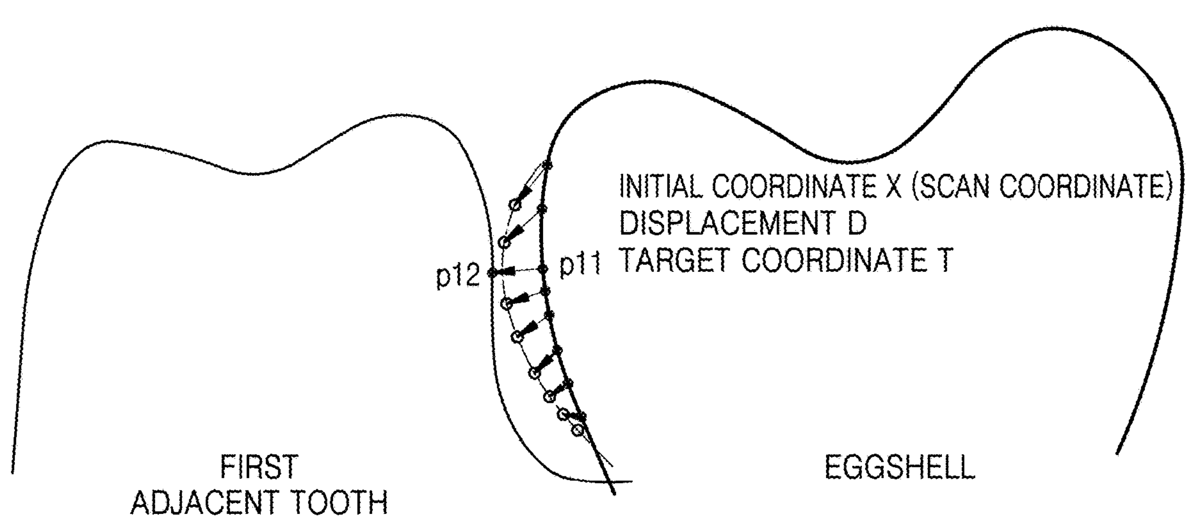
FIG. 20 is a reference diagram illustrating displacement representing changes of an eggshell, according to an embodiment.

FIG. 20 is a reference diagram illustrating displacement representing changes of an eggshell, according to an embodiment.

FIG. 20 illustrates displacement of points included in the eggshell model. The eggshell model may include a plurality of vertices, and the expansion movement of the eggshell may eventually be explained by changes in locations of such vertices. The initial locations of the vertices constituting the eggshell model illustrated in FIG. 20 may be marked with black dots, and target locations after the movement of the vertices may be marked with white dots. The displacement showing the movement of each vertex may be marked with an arrow.

For example, the initial locations of the vertices may be represented by {X1, X2, X3, X4, X5, . . . . Xn}, the target locations after the movement of the vertices may be represented by {T1, T2, T3, T4, T5, . . . . Tn}, and the displacement showing the movement of the vertices from the initial locations to the target locations may be represented by {D1, D2, D3, D4, D5, . . . . Dn}.

Based on a set of such displacements, gum modification may be induced.

The eggshell model may have numerous vertices, and eggshell modification may be induced by using only the displacement of the preset number of vertices among the numerous vertices. The preset number may vary.

According to and embodiment, when the target jaw data intersects the eggshell, as described above, the data processing device 100 may find the points at which the distance between the target jaw data and the eggshell is maximum, and based on the points at which the distance between the target jaw data and the eggshell is maximum, cut the eggshell. The data processing device 100 may remove a partial area of the eggshell model by using a cutting tool.

Figure 21:
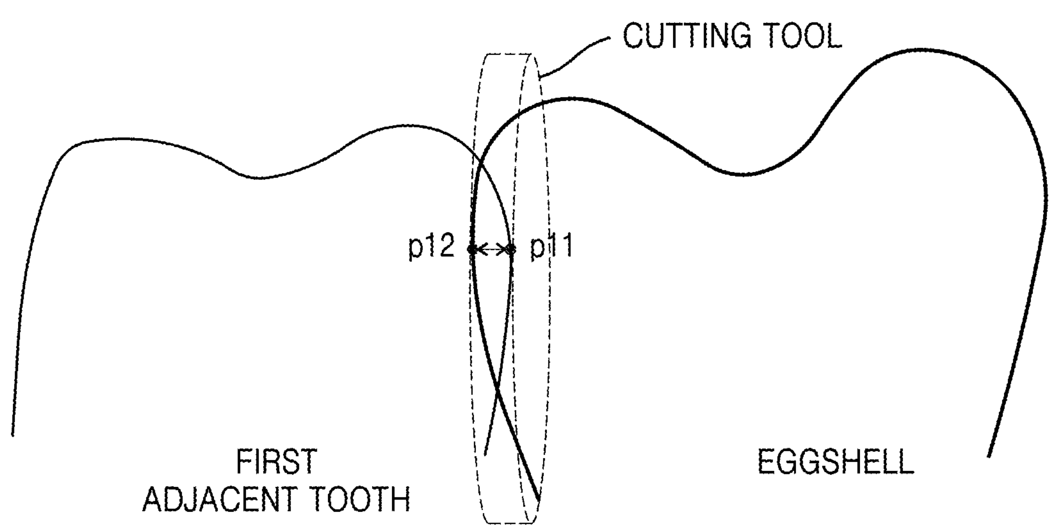
FIG. 21 is a reference diagram illustrating a method of cutting an eggshell model by using a cutting tool, according to an embodiment.
Figure 21:
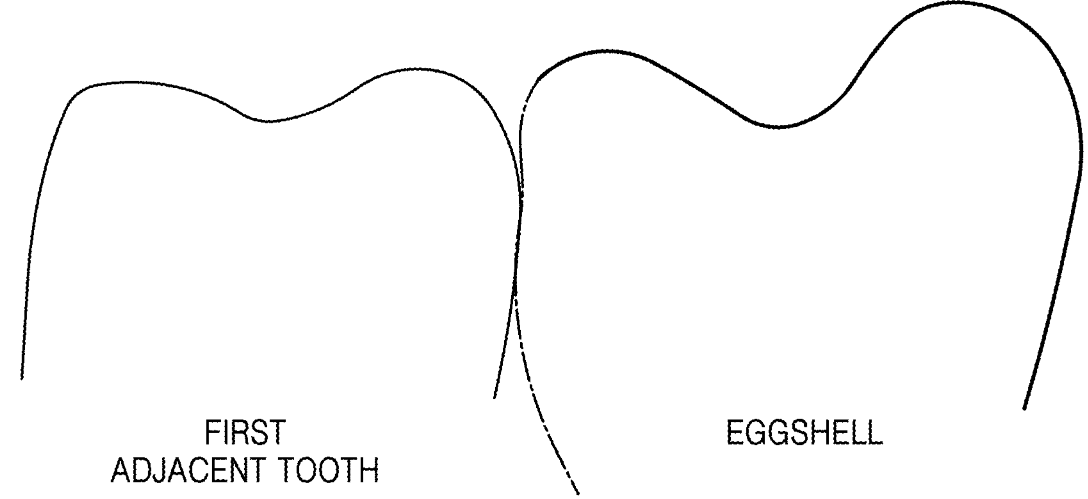

FIG. 21 is a reference diagram illustrating a method of cutting an eggshell model by using a cutting tool, according to an embodiment.

Referring to FIG. 21, the data processing device 100 may generate a cutting too used to remove a partial area of the eggshell model.

According to an embodiment, the data processing device 100 may generate a cutting tool having a diameter greater than a height of the eggshell and a height identical to the maximum distance between the first adjacent tooth and the eggshell (for example, a distance between p11 and p12). In addition, the data processing device 100 may remove a partial area of the eggshell through Boolean subtraction of the generated cutting tool and the eggshell model. The Boolean method refers to a calculation of combining two objects for modeling, and Boolean subtraction refers to a calculation of cutting one object off the other object to generate a surface.

In the embodiments described above, the data processing device 100 may use preparation tooth data in adjacent tooth adaptation. As the preparation tooth data may obtain the scan data by scanning the adjacent tooth adjacent to the restoration target tooth, the adjacent tooth data may also be obtained. When the data processing device 100 uses only the pre-preparation tooth data without the preparation tooth data, it may be difficult for the preparation tooth data to obtain complete scan data of the adjacent tooth adjacent to the restoration target tooth. That is, scan data of a portion of the adjacent tooth occluded by the restoration target data may not be completely obtained. Hereinafter, provided is the method of performing adaptation of the adjacent tooth when the data processing device 100 only has the pre-preparation tooth data.

Figure 22:
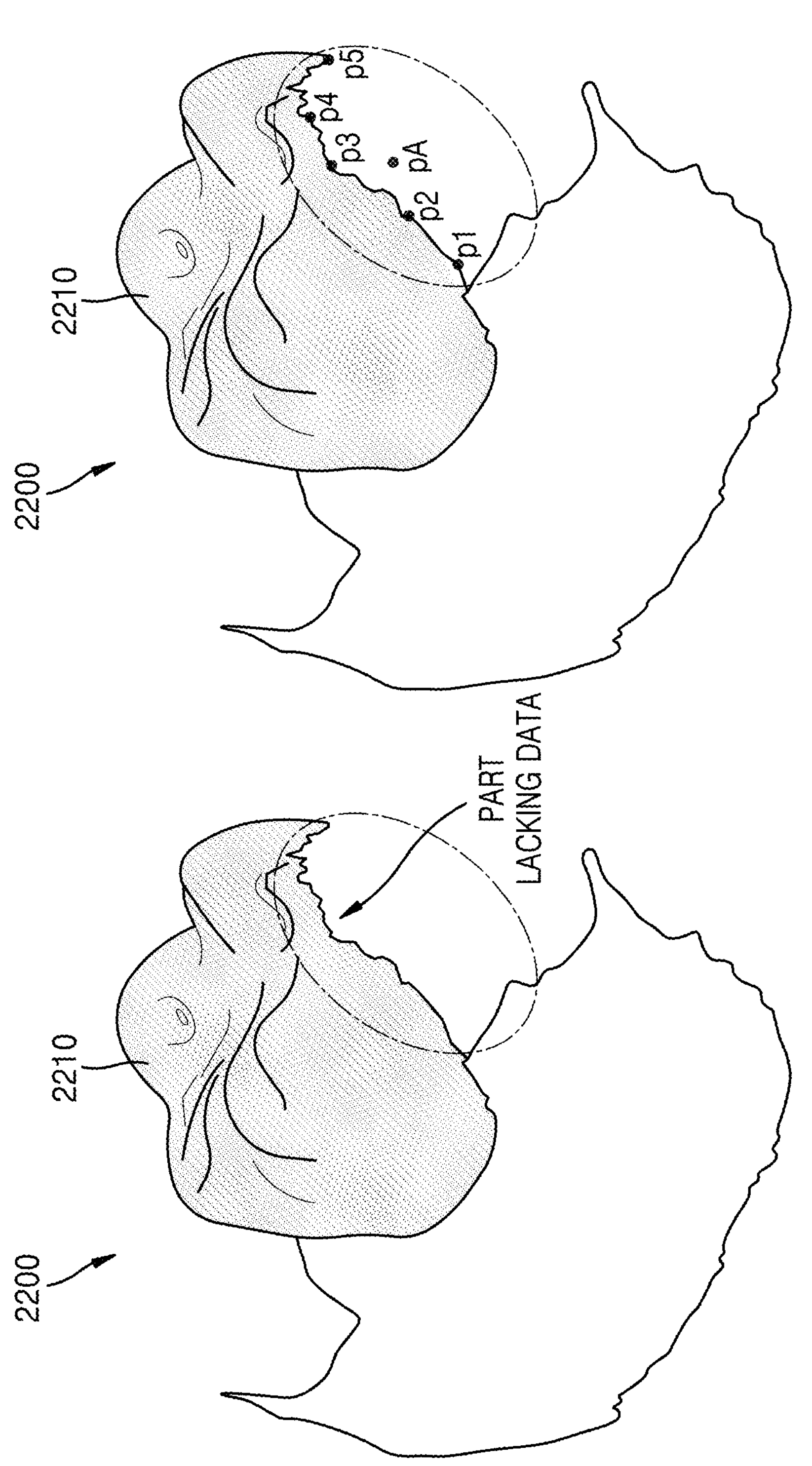
FIG. 22 is a reference diagram illustrating a method of performing adjacent tooth adaptation by using data of a pre-preparation tooth, according to an embodiment.

FIG. 22 is a reference diagram illustrating a method of performing adjacent tooth adaptation by using data of a pre-preparation tooth, according to an embodiment.

Referring to FIG. 22, the data processing device 100 may obtain pre-preparation tooth data 2200. The pre-preparation tooth data 2200 may include adjacent tooth data 2210 adjacent to tooth restoration target data. The adjacent tooth data 2210 may include a part lacking data due to omission of scanning caused by the pre-preparation tooth.

The data processing device 100 may find points by using the preparation tooth data in the same manner as used in finding the points at which the distance between the eggshell and the adjacent tooth is minimum.

The data processing device 100 may find points at which the distance between the eggshell and the adjacent tooth data 2210 is minimum by irradiating a 360° ray in the X axis direction perpendicular to the Y axis direction while the central point moves in the Y axis direction, which is the occlusal direction, starting from the central point c0 of the eggshell. As the adjacent tooth data 2210 is data before preparation, there may be a part lacking data, and in such part, points at which the distance between the eggshell and the adjacent tooth data 2210 is minimum may not be found. The data processing device 100 may find points at which the distance between the eggshell and the adjacent tooth data mainly on a boundary of the adjacent tooth data 2210.

The data processing device 100 may find the preset number of points at which the distance between the eggshell and the adjacent tooth data 2210 is minimum, determine one point based on the found points, and find a distance between the eggshell and the adjacent tooth data is minimum based on the determined point. The present number may vary. For example, in FIG. 22, the data processing device 100 may find five points at which the distance between the eggshell and the adjacent tooth data 2210 is minimum, i.e., p1, p2, p3, p4, and p5. The data processing device 100 may determine one point PA determined by an average value of the found five points. The data processing device 100 may determine the determined point as a point at which the distance between the eggshell and the adjacent tooth data 2210 is minimum.

Figure 23:
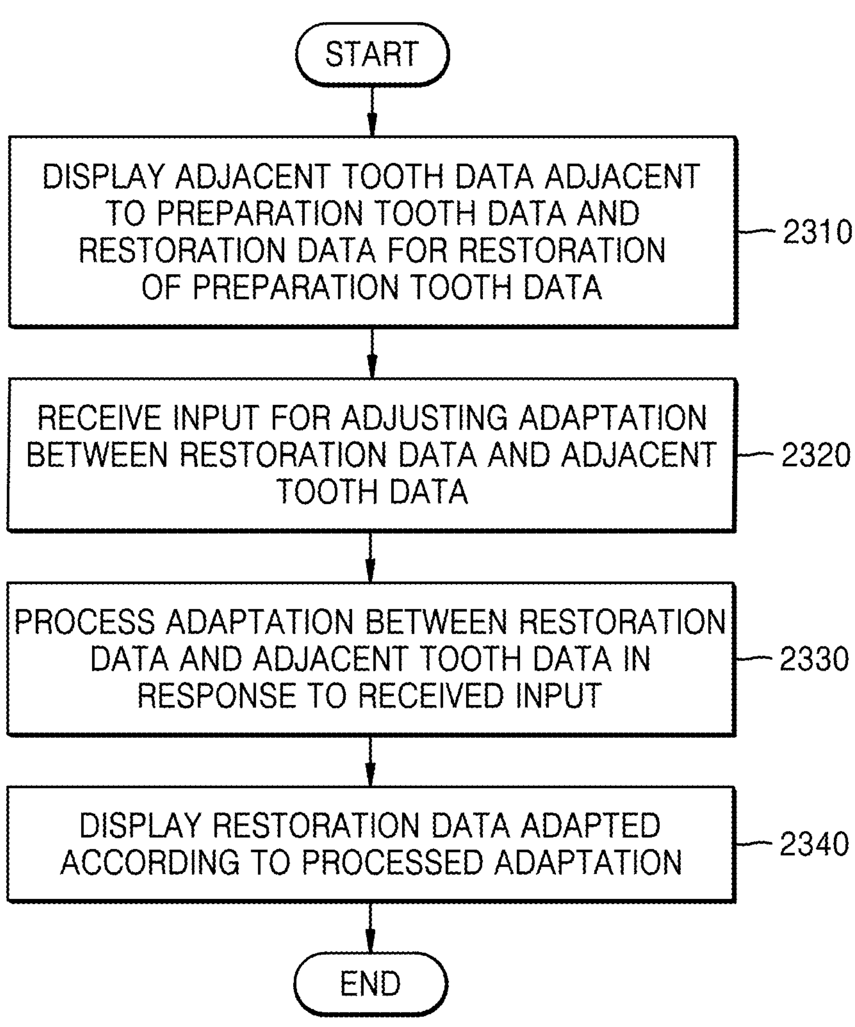
FIG. 23 is a flowchart illustrating an example of an operation method of a data processing device, according to an embodiment.

FIG. 23 is a flowchart illustrating an example of an operation method of a data processing device, according to an embodiment.

Referring to FIG. 23, in operation 2310, the data processing device 100 may display on a display the adjacent tooth data adjacent to the preparation tooth data and the restoration data for restoration of the preparation tooth data.

In operation 2320, the data processing device 100 may receive an input for adjusting adaptation between the restoration data and the adjacent tooth data.

According to an embodiment, the data processing device 100 may provide a user interface which facilitates adjustment of the adaptation between the restoration data and the adjacent tooth data. The adaptation between the restoration data and the adjacent tooth data may refer to expansion or cutting of the restoration data such that the restoration data is at a proper distance with the adjacent tooth data.

In operation 2330, the data processing device 100 may process the adaptation between the restoration data and the adjacent tooth data in response to the received input.

According to an embodiment, the data processing device 100 may receive a user input for adjusting adaptation through a user interface for adjustment of adaptation between the restoration data and the adjacent tooth data.

According to an embodiment, the data processing device 100 may transform the restoration data through expansion or cutting of the restoration data in response to the user input received through the user interface.

According to an embodiment, when the user input received though the user interface is to increase the adaptation, the data processing device 100 may transform the restoration data such that the restoration data perfectly engages with the adjacent tooth.

According to an embodiment, when the user input received though the user interface is to decrease the adaptation, the data processing device 100 may transform the restoration data such that the restoration data loosely engages with the adjacent tooth.

In operation 2340, the data processing device 100 may display the restoration data adapted according to the processed adaptation.

Figure 24:
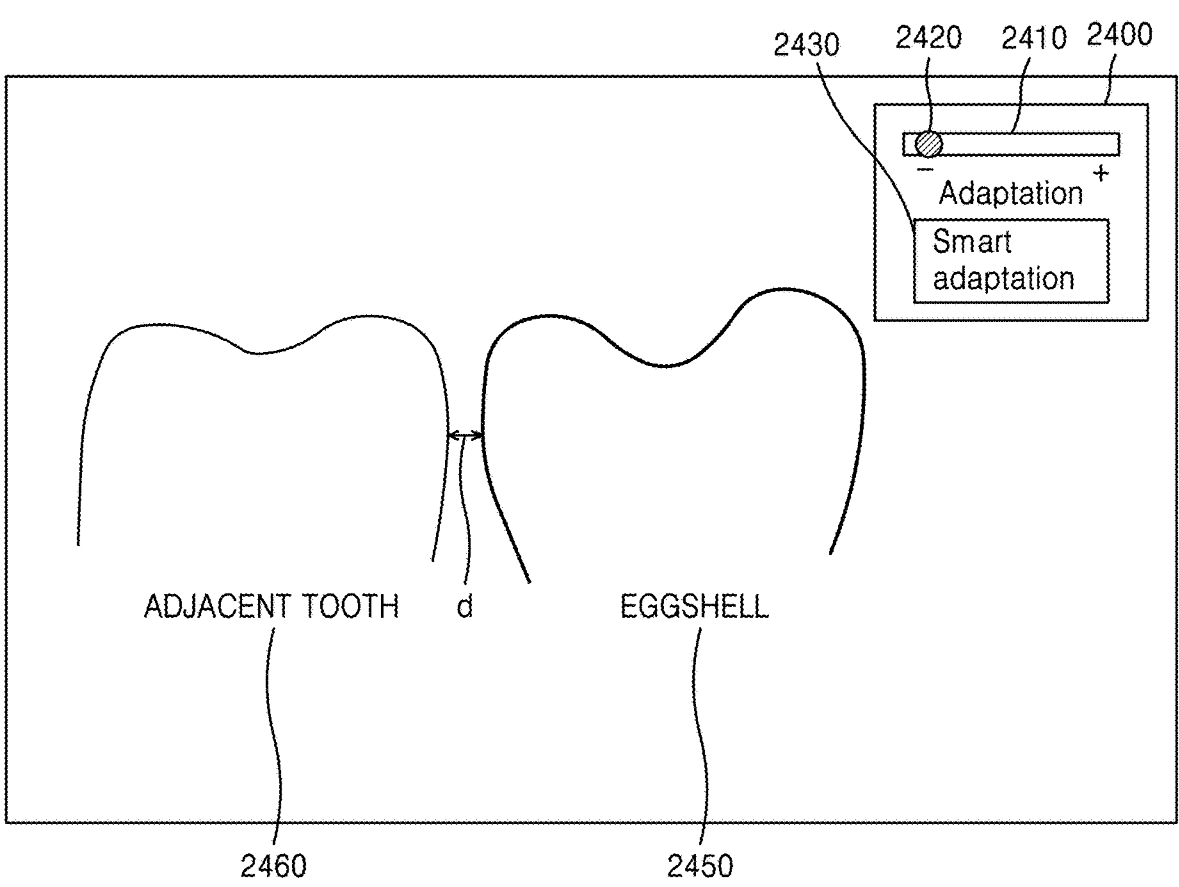
FIG. 24 is a diagram illustrating an example of a user interface which facilitates adaptation of restoration data to adjacent tooth data, according to an embodiment.

FIG. 24 is a diagram illustrating an example of a user interface which facilitates adaptation of restoration data to adjacent tooth data, according to an embodiment.

Referring to FIG. 24, the data processing device 100 may display on a display an eggshell 2450 and adjacent tooth data 2460 adjacent to the eggshell. The eggshell 2450 and the adjacent tooth data 2460 may be displayed as being apart from each other without intersection.

The data processing device 100 may also output a user interface 2400 which facilitates adjustment of adaptation between the eggshell and the adjacent tooth. The user interface 2400 may include a bar 2410 which facilitates selection of a degree of adaptation between the eggshell and the adjacent tooth and a slide button 2420 which enables movement on the bar 2410. A user may adjust a degree of adaptation by moving the slide button 2420 left and right on the bar 2410. For example, when the button 2420 is close to – direction on the bar 2410, it means that the adaptation degree is low, which may, for example, show a current state. When the button 2420 is close to + direction on the bar 2410, it means that the adaptation degree is high, and that, for example, the eggshell is transformed such that the adjacent tooth and the eggshell perfectly engage with each other.

The user interface 2400 may provide a smart adaptation item 2430 providing automatic adaptation of the eggshell and the adjacent tooth. According to selection of such smart adaptation item 2430, the data processing device 100 may automatically adjust and display the adaptation between the eggshell and the adjacent tooth.

Figure 25:
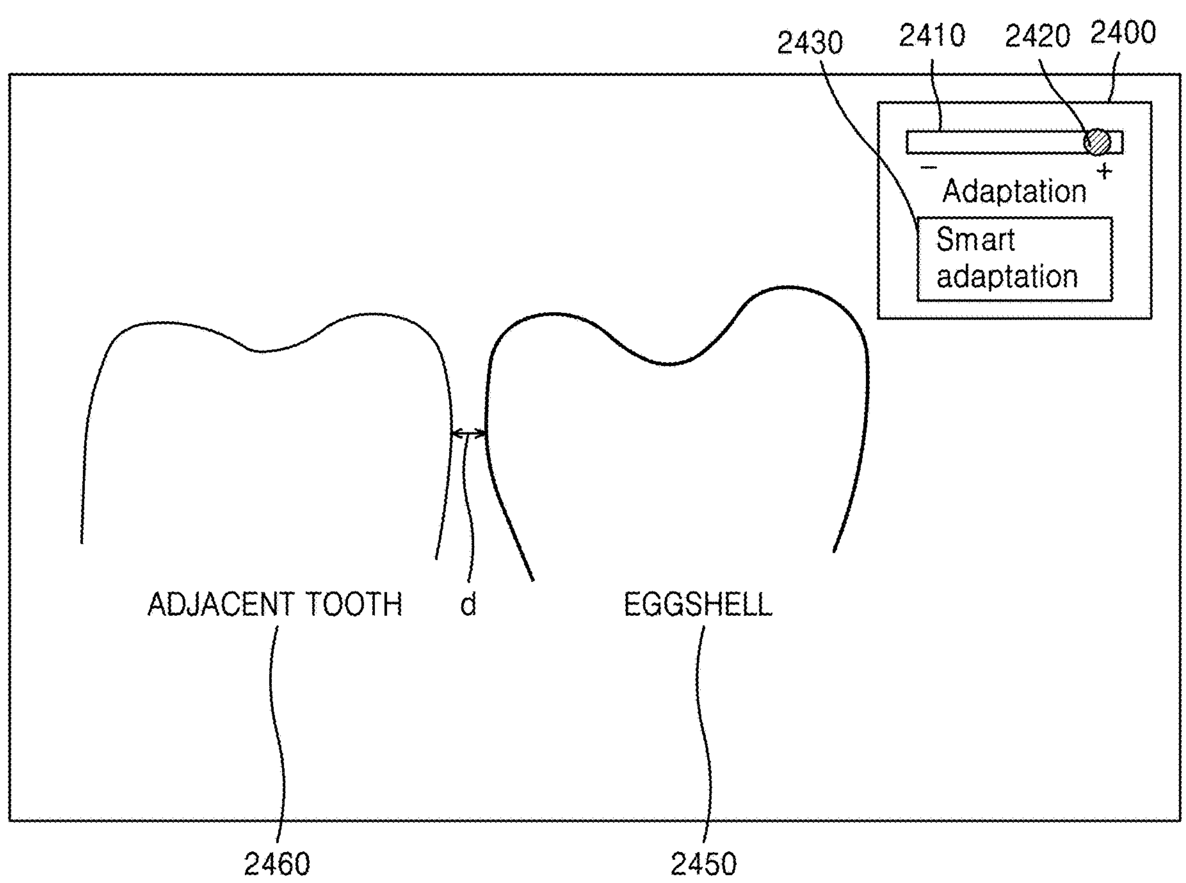
FIG. 25 is a diagram illustrating an example of a user interface which facilitates adaptation of restoration data to adjacent tooth data, according to an embodiment.

FIG. 25 is a diagram illustrating an example of a user interface which facilitates adaptation of restoration data to adjacent tooth data, according to an embodiment.

Referring to FIG. 25, when a user input of moving the slide button 2420 in the + direction on the bar 2410 is received from a user, the data processing device 100 may transform the eggshell such that the adjacent tooth and the eggshell perfectly engage with each other. Accordingly, the data processing device 100 may expand the eggshell to the extent that the adjacent toot is adjacent to the eggshell, and display the same.

The method of processing an oral image according to an embodiment of the present disclosure may be implemented in the form of program instruction executable by various computing devices and may be recorded in a computer-readable medium. In addition, according to an embodiment of the present disclosure, provided is a computer-readable storage medium having recorded thereon at least one program including at least one instruction for executing the method of processing an oral image.

The computer-readable storage medium may include a program instruction, a data file, a data structure, etc. separately or combinedly. The computer-readable storage medium may include a hardware device configured to store and execute program instructions, such as magnetic media including a hard disk, a floppy disk, and a magnetic tape, optical media such as a CD-ROM and a DVD, magneto-optical media such as a floptical disk, ROM, RAM, flash memory, etc.

The apparatus-readable storage medium may be provided in the form of a non-transitory storage medium. The term "non-transitory storage medium" means that the storage medium is a tangle device. Moreover, the "non-transitory storage medium" may include a buffer in which data is temporarily stored.

According to an embodiment, the oral image processing method according to various embodiments of the present disclosure may be included and provided in a computer program product. The computer program product may be distributed in the form of an apparatus-readable storage medium, for example, a compact disc read only memory (CD-ROM). Or, the computer program product may be distributed online (for example, downloaded or uploaded) directly between two user devices (for example, smartphones) through an application store (for example, play store, etc.) More specifically, the computer program product according to the disclosed embodiments may include a storage medium on which a program including at least one instruction for performing the oral image processing method according to the disclosed embodiments is recorded.

While the embodiments are described in detail, the scope of rights of the present disclosure is not limited thereto, and various modifications and improvements made by using the fundamental concept of the present disclosure defined in the following scope of claims may also be included in the scope of rights of the present disclosure.

The invention claimed is:

1. A method of processing an oral image, the method comprising:

displaying adjacent tooth data adjacent to preparation tooth data and restoration data for restoration of the preparation tooth data;

receiving an input for adjusting adaptation between the restoration data and the adjacent tooth data;

processing the adaptation between the restoration data and the adjacent tooth data in response to the received input; and displaying the restoration data adapted according to the processed adaptation, wherein the processing of the adaptation comprises:

identifying a direction of a first ray directed in a direction perpendicular to an occlusal direction of the restoration data from a center of the restoration data and a direction of a second ray directed towards a point of the adjacent tooth data from a point at which the first ray meets the restoration data, and based on the direction of the first ray being identical to the direction of the second ray, determining that the restoration data does not intersect the adjacent tooth data, and based on the direction of the first ray being different from the direction of the second ray, determining that the restoration data intersects the adjacent tooth data.

2. The method of claim 1, further comprising:

providing a user interface including a smart adaptation item; and in response to a user input of selecting the smart adaptation item, processing the restoration data such that the restoration data is adjacent to the adjacent tooth data and displaying the processed restoration data.

3. The method of claim 1, wherein the processing of the adaptation comprises:

based on the restoration data not intersecting the adjacent tooth data, identifying a point of the restoration data at which a distance between the restoration data and the adjacent tooth data is minimum; and based on the identified point of the restoration data, transforming the restoration data by an amount corresponding to the received input.

4. The method of claim 3, further comprising transforming the restoration data by using at least one of image morphing and mesh deformation.

5. The method of claim 1, wherein the processing of the adaptation comprises:

based on the restoration data intersecting the adjacent tooth data, identifying a point of the restoration data at which a distance between the restoration data and the adjacent tooth data is maximum; and based on the identified point of the restoration data, cutting the restoration data by an amount corresponding to the received input.

6. The method of claim 1, further comprising cutting the restoration data by using a cutting tool used to remove a partial area of the restoration data.

7. A data processing device configured to process an oral image, the data processing device comprising:

a memory storing at least one instruction; and a processor configured to execute the at least one instruction stored in the memory, wherein, by executing the at least one instruction, the processor is further configured to:

display adjacent tooth data adjacent to preparation tooth data and restoration data for restoration of the preparation tooth data;

receive an input for adjusting adaptation between the restoration data and the adjacent tooth data;

process the adaptation between the restoration data and the adjacent tooth data in response to the received input; and display the restoration data adapted according to the processed adaptation, wherein by executing the at least one instruction, the processor is further configured to:

identify a direction of a first ray directed in a direction perpendicular to an occlusal direction of the restoration data from a center of the restoration data and a direction of a second ray directed towards a point of the adjacent tooth data from a point at which the first ray meets the restoration data, and based on the direction of the first ray being identical to the direction of the second ray, determine that the restoration data does not intersect the adjacent tooth data, and based on the direction of the first ray being different from the direction of the second ray, determine that the restoration data intersects the adjacent tooth data.

8. The data processing device of claim 7, wherein, by executing the at least one instruction, the processor is further configured to:

provide a user interface including a smart adaptation item; and in response to a user input of selecting the smart adaptation item, automatically process the restoration data such that the restoration data is adjacent to the adjacent tooth data and display the processed restoration data.

9. The data processing device of claim 7, wherein, by executing the at least one instruction, the processor is further configured to:

based on the restoration data does not intersecting the adjacent tooth data, identify a point of the restoration data at which a distance between the restoration data and the adjacent tooth data is minimum; and based on the identified point of the restoration data, transform the restoration data by an amount corresponding to the received input.

10. The data processing device of claim 9, wherein, by executing the at least one instruction, the processor is further configured to transform the restoration data by using at least one of image morphing and mesh deformation.

11. The data processing device of claim 7, wherein, by executing the at least one instruction, the processor is further configured to:

based on the restoration data intersecting the adjacent tooth data, identify a point of the restoration data at which a distance between the restoration data and the adjacent tooth data is maximum; and based on the identified point of the restoration data, cut the restoration data by an amount corresponding to the received input.

12. The data processing device of claim 7, wherein, by executing the at least one instruction, the processor is further configured to cut the restoration data by using a cutting tool used to remove a partial area of the restoration data.

13. A non-transitory computer-readable recording medium having recorded thereon a program which, when executed, causes a computing apparatus to perform operations, the operations comprising:

displaying adjacent tooth data adjacent to preparation tooth data and restoration data for restoration of the preparation tooth data;

receiving an input for adjusting adaptation between the restoration data and the adjacent tooth data;

processing the adaptation between the restoration data and the adjacent tooth data in response to the received input; and displaying the restoration data adapted according to the processed adaptation, wherein the processing of the adaptation comprises:

identifying a direction of a first ray directed in a direction perpendicular to an occlusal direction of the restoration data from a center of the restoration data and a direction of a second ray directed towards a point of the adjacent tooth data from a point at which the first ray meets the restoration data, and based on the direction of the first ray being identical to the direction of the second ray, determining that the restoration data does not intersect the adjacent tooth data, and based on the direction of the first ray being different from the direction of the second ray, determining that the restoration data intersects the adjacent tooth data.

* * * * *